(12) United States Patent
Donley et al.

(10) Patent No.: US 11,671,250 B2
(45) Date of Patent: Jun. 6, 2023

(54) MIGRATION FOR WEARABLE TO NEW COMPANION DEVICE

(71) Applicant: Apple Inc., Cupertino, CA (US)

(72) Inventors: David C. Donley, San Jose, CA (US); Per Love Hornquist Astrand, Santa Clara, CA (US); Chen Ganir, San Jose, CA (US); Craig P. Dooley, Cupertino, CA (US); James C. Grandy, Redwood City, CA (US); Julien A. Poumailloux, San Francisco, CA (US); Tyler D. Hawkins, San Jose, CA (US); David S. Wilser, San Jose, CA (US); David P. Remahl, Woodside, CA (US)

(73) Assignee: APPLE INC., Cupertino, CA (US)

( * ) Notice: Subject to any disclaimer, the term of this patent is extended or adjusted under 35 U.S.C. 154(b) by 728 days.

(21) Appl. No.: 15/965,544

(22) Filed: Apr. 27, 2018

(65) Prior Publication Data

US 2018/0352435 A1 Dec. 6, 2018

Related U.S. Application Data

(60) Provisional application No. 62/514,908, filed on Jun. 4, 2017.

(51) Int. Cl.
*G06F 21/00* (2013.01)
*H04L 9/08* (2006.01)
(Continued)

(52) U.S. Cl.
CPC .......... *H04L 9/0872* (2013.01); *H04L 9/0869* (2013.01); *H04L 9/0891* (2013.01);
(Continued)

(58) Field of Classification Search
CPC ... H04L 9/0872; H04L 9/0869; H04L 9/0891; H04L 9/14; H04W 12/0602; H04W 12/0401; H04W 12/04071; H04W 12/0023
See application file for complete search history.

(56) References Cited

U.S. PATENT DOCUMENTS

| 10,565,648 B1* | 2/2020 | Kalechstain | ........... G06Q 40/04 |
| 2003/0110382 A1* | 6/2003 | Leporini | ............ H04N 21/4623 713/172 |

(Continued)

OTHER PUBLICATIONS

Weitao Xu et al., Gait-Key: A Gait-Based Shared Secret Key Generation Protocol for Wearable Devices, Feb. 2017, ACM, vol. 13, Issue 1, pp. 1-27. (Year: 2017).*

(Continued)

*Primary Examiner* — Luu T Pham
*Assistant Examiner* — Fahimeh Mohammadi
(74) *Attorney, Agent, or Firm* — Kilpatrick Townsend & Stockton LLP

(57) ABSTRACT

Migration of a pairing of wearable device to a new companion electronic device is disclosed. In one embodiment, pairing migration is performed by syncing and verifying a migration key in the wearable and new companion device. Pairing migration includes moving settings and pairing data of the wearable to the new companion device in response to detecting the wearable is associated with the migration key, wherein the migration key establishes a validation of trust of the wearable relative to the companion device. The settings and pairing data can include configuration and protected data and one or more keys to establish a trust relationship between the wearable and new companion device. The settings and pairing data can also include device data such that the wearable can be discoverable by the new companion device.

17 Claims, 16 Drawing Sheets

(51) Int. Cl.
| | |
|---|---|
| *H04L 9/40* | (2022.01) |
| *H04L 9/14* | (2006.01) |
| *H04W 4/80* | (2018.01) |
| *H04W 12/30* | (2021.01) |
| *H04W 12/041* | (2021.01) |
| *H04W 12/062* | (2021.01) |
| *H04W 12/0471* | (2021.01) |
| *H04W 12/50* | (2021.01) |
| *H04L 9/00* | (2022.01) |

(52) U.S. Cl.
CPC .......... *H04L 9/14* (2013.01); *H04L 63/0428* (2013.01); *H04W 4/80* (2018.02); *H04W 12/041* (2021.01); *H04W 12/0471* (2021.01); *H04W 12/062* (2021.01); *H04W 12/35* (2021.01); *H04L 9/50* (2022.05); *H04L 2209/80* (2013.01); *H04W 12/50* (2021.01)

(56) References Cited

U.S. PATENT DOCUMENTS

| | | | | |
|---|---|---|---|---|
| 2006/0010324 | A1* | 1/2006 | Appenzeller | H04L 9/083 |
| | | | | 713/171 |
| 2008/0313462 | A1* | 12/2008 | Zhao | H04L 9/0844 |
| | | | | 713/170 |
| 2012/0042087 | A1* | 2/2012 | Berg | H04L 63/18 |
| | | | | 709/229 |
| 2012/0328096 | A1* | 12/2012 | Shah | H04L 9/3271 |
| | | | | 380/33 |
| 2012/0331177 | A1* | 12/2012 | Jensen | H04L 67/1095 |
| | | | | 709/248 |
| 2013/0198816 | A1* | 8/2013 | Bohli | H04L 63/18 |
| | | | | 726/4 |
| 2015/0295713 | A1* | 10/2015 | Oxford | H04L 9/3242 |
| | | | | 713/171 |
| 2016/0080372 | A1* | 3/2016 | Martin | H04W 12/06 |
| | | | | 713/168 |
| 2016/0085955 | A1* | 3/2016 | Lerner | H04L 9/0869 |
| | | | | 726/20 |
| 2016/0219424 | A1* | 7/2016 | Xu | H04W 8/005 |
| 2016/0267310 | A1* | 9/2016 | AlNasser et al. | G06F 1/1698 |
| 2016/0364787 | A1* | 12/2016 | Walker | H04L 9/0891 |
| 2017/0091426 | A1* | 3/2017 | Johnson | G16H 10/20 |
| 2017/0149771 | A1* | 5/2017 | Vincent | H04W 12/06 |
| 2017/0185052 | A1* | 6/2017 | Wang | G06Q 20/321 |
| 2017/0339128 | A1* | 11/2017 | Lim | H04L 63/0861 |
| 2018/0115897 | A1* | 4/2018 | Einberg | H04W 12/04 |
| 2018/0255451 | A1* | 9/2018 | Fan | H04W 8/20 |
| 2019/0253874 | A1* | 8/2019 | Salm | H04W 60/00 |

OTHER PUBLICATIONS

Hsin-Peng Lin et al., A Virtual Local-hub Solution with Function Module Sharing for Wearable Devices, Nov. 13, 2016, ACM, pp. 278-286. (Year: 2016).*

Kerolos Lotfy et al., Assessing Pairing and Data Exchange Mechanism Security in the Wearable Internet of Things, Dec. 19, 2016, IEEE (Year: 2016).*

Mark Billinghurst et al., Wearable devices New Ways to Manage Information, Jan. 1999, IEEE, vol. 32, Issue: 1, pp. 57-64. (Year: 1999).*

* cited by examiner

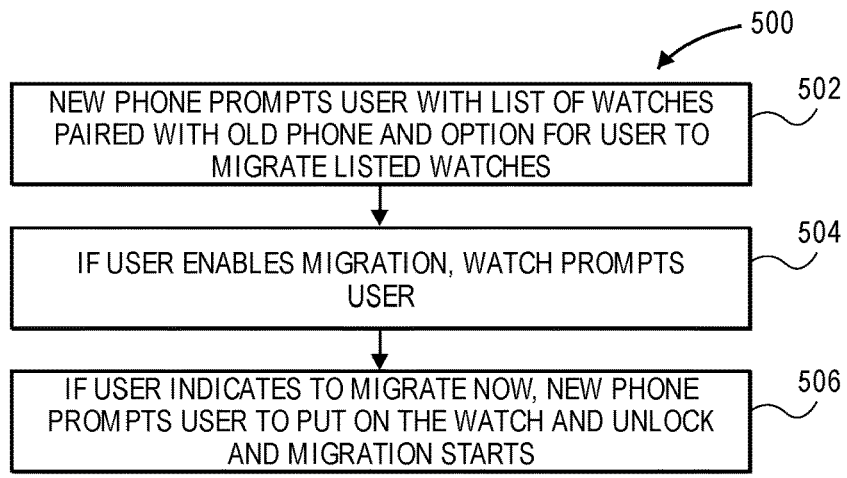
FIG. 5A
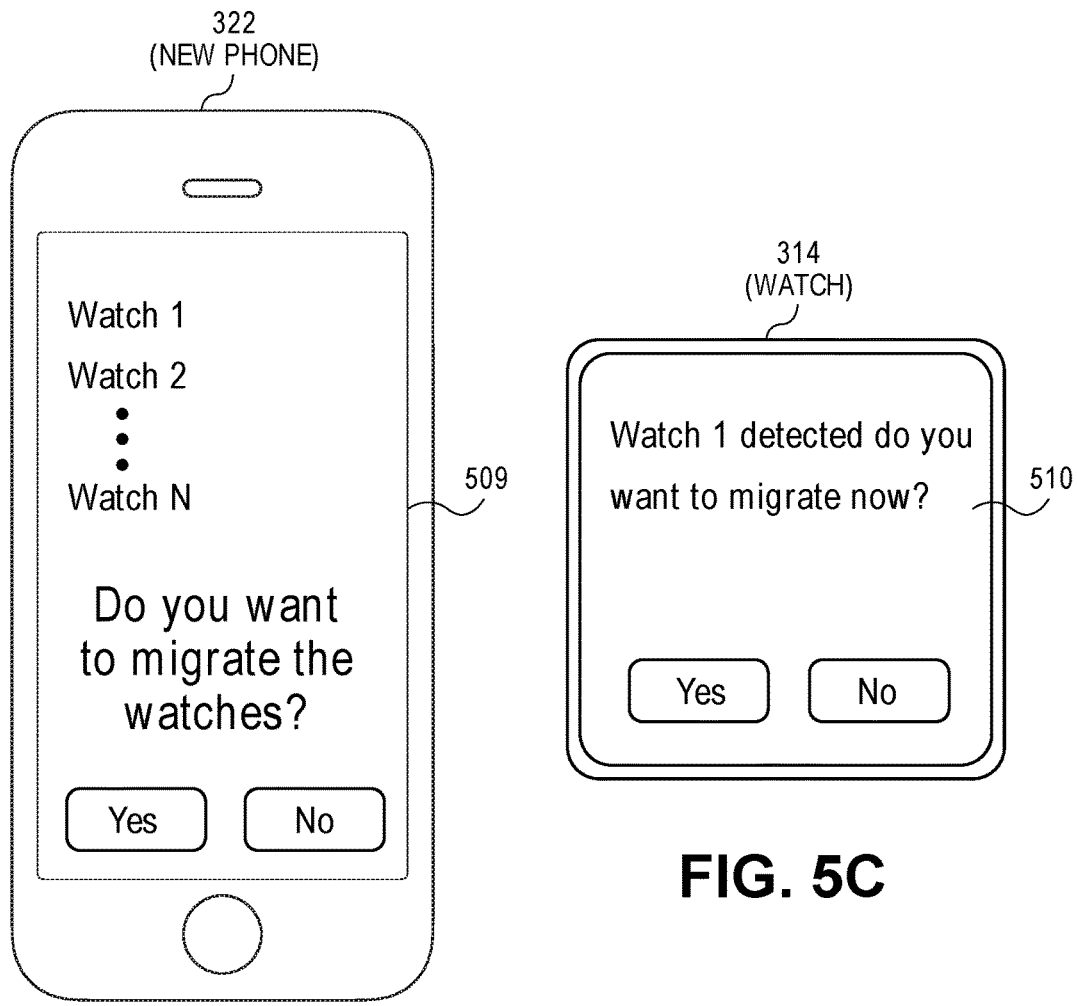
FIG. 5B
FIG. 5C

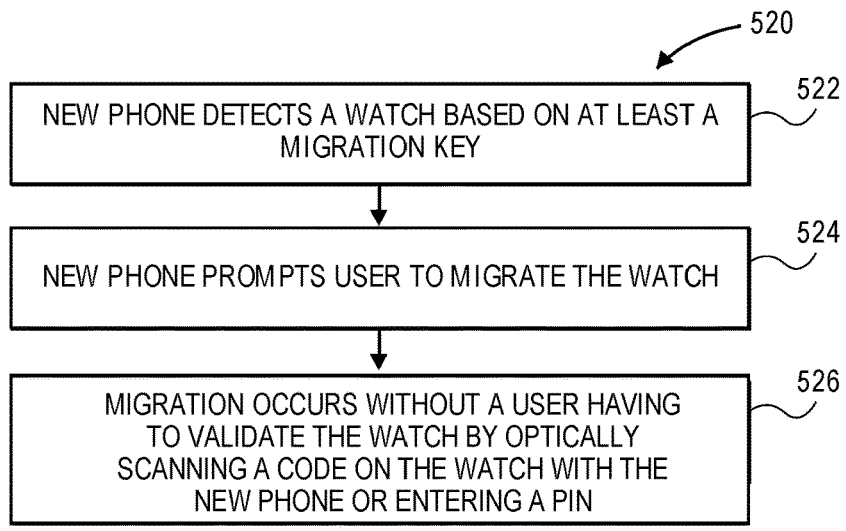
FIG. 5D
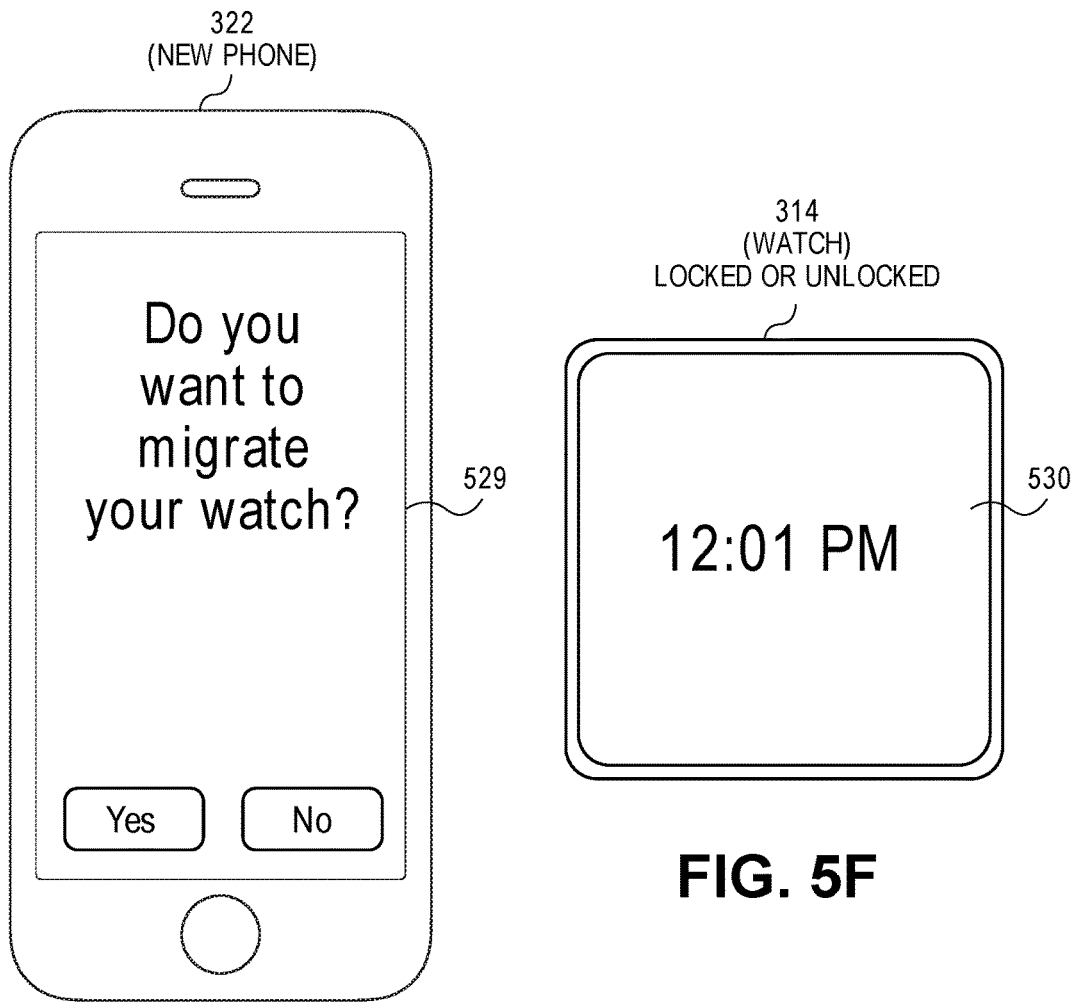
FIG. 5E
FIG. 5F

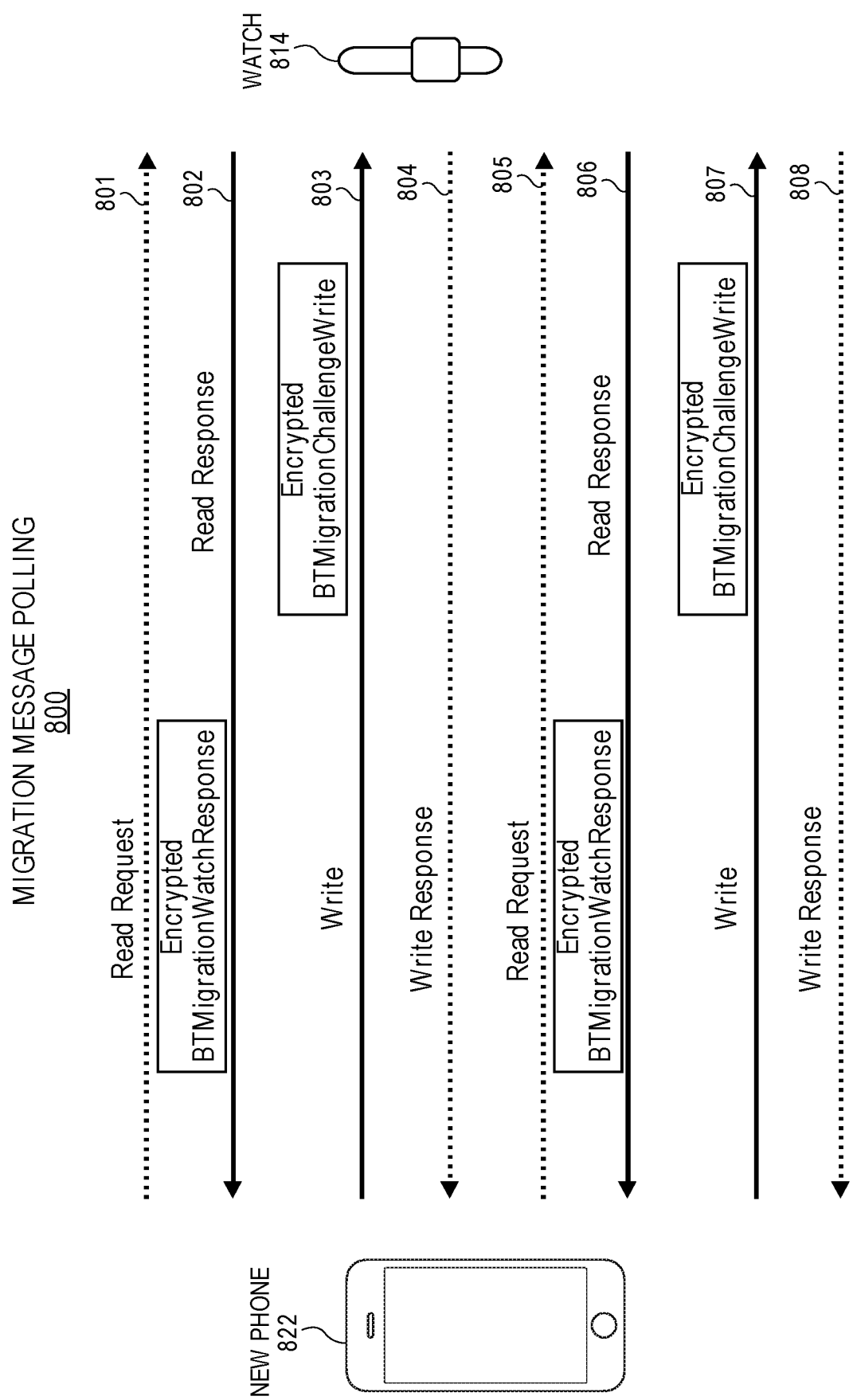

MIGRATION FOR WEARABLE TO NEW COMPANION DEVICE

CROSS-REFERENCE TO RELATED APPLICATIONS

This application claims priority and the benefit of U.S. Provisional Patent Application No. 62/514,908, entitled "MIGRATION FOR WEARABLE TO NEW COMPANION DEVICE," filed on Jun. 4, 2017, which is commonly assigned and incorporated herein by reference.

TECHNICAL FIELD

This invention relates generally to a wearable with a companion device and, more particularly, to migration for a wearable to a new companion device.

BACKGROUND

Wearable devices or accessories, such as a smart watch device, can be paired with a companion device, such as a smartphone, using a wireless communication technique. After pairing, data can be shared or synced between the watch and the companion device. For example, a wearable device can be paired with a companion device and data can be shared or exchanged between the devices. The shared data can include private data stored on the wearable device, which can be backed up to the companion device. Data that is backed up to the companion device can then be securely stored as part of a backup of the smartphone device. If a backup of the companion device is restored to the same companion device, the pairing between the wearable and the companion device may be maintained. However, should the user apply the backup to a new or different companion device, the backup may not allow the pairing relationship to be maintained on the new or different companion device.

SUMMARY OF THE DESCRIPTION

Described herein are techniques to migrate a pairing of wearable device to a new companion electronic device is disclosed. In one embodiment, pairing migration is performed by syncing and verifying a migration key in the wearable and new companion device. Pairing migration includes moving settings and pairing data of the wearable to the new companion device in response to detecting the wearable is associated with the migration key, wherein the migration key establishes a validation of trust of the wearable relative to the companion device. The settings and pairing data can include configuration and protected data and one or more keys to establish a trust relationship between the wearable and new companion device. The settings and pairing data can also include device data such that the wearable can be discoverable by the new companion device.

One embodiment provides for a non-transitory machine-readable medium storing instructions which, when executed by one or more processors of an electronic device, cause the electronic device to perform operations to pair the electronic device to a wearable device, the operations comprising receiving a migration key, the migration key to validate a trust relationship between the electronic device and the wearable device determining if the wearable device is associated with the migration key; and migrating a pairing of the wearable device to the electronic device, wherein migrating the pairing of the wearable device includes moving settings and pairing data of the wearable device to the electronic device in response to detecting the wearable device is associated with the migration key.

One embodiment provides for a method performed by an electronic watch device, the method comprising advertising without a name using an identification (ID) key; receiving validation from a mobile electronic device, the mobile electronic device having the ID key and a migration key; sending an encrypted message to the mobile electronic device based on a first derived key, the encrypted message including a random number; receiving an encrypted message based on a second derived key from the mobile electronic device, the encrypted message including the random number, wherein the second derived key is different than the first derived key; and migrating a pairing of the electronic watch device to the mobile electronic device after the random number is received from the mobile electronic device by moving settings and pairings of the electronic watch devices to the mobile electronic device in response to detecting the electronic watch device is associated with the migration key, wherein the migration key establishes a validation of trust of the electronic watch device relative to the mobile electronic device.

One embodiment provides for a data processing system comprising a memory controller coupled to one or more memories to store data; a radio controller coupled to a radio transceiver; and one or more application processors coupled to the memory controller and the radio controller, the one or more application processors executing an operating system and one or more applications on the data processing system, which is a wireless communication device, the one or more application processors configured to receive a migration key; detect if a wearable is associated with the migration key; and migrate a pairing of the wearable to the data processing system by moving settings and pairings of the wearable to the data processing system, the migration in response to detection that the wearable is associated with the migration key, wherein the migration key establishes a validation of trust of the wearable relative to the data processing system.

Other methods, operations, systems and migration models are disclosed.

BRIEF DESCRIPTION OF THE DRAWINGS

The present invention is illustrated by way of example, and not limitation, in the figures of the accompanying drawings, in which like references indicate similar elements.

FIG. 5A-5F illustrate an additional method and associated user interfaces to migrate a wearable device to new companion device, according to embodiments described herein.

FIG. 8 illustrates migration message polling, according to an embodiment.

DETAILED DESCRIPTION

Figure 1:
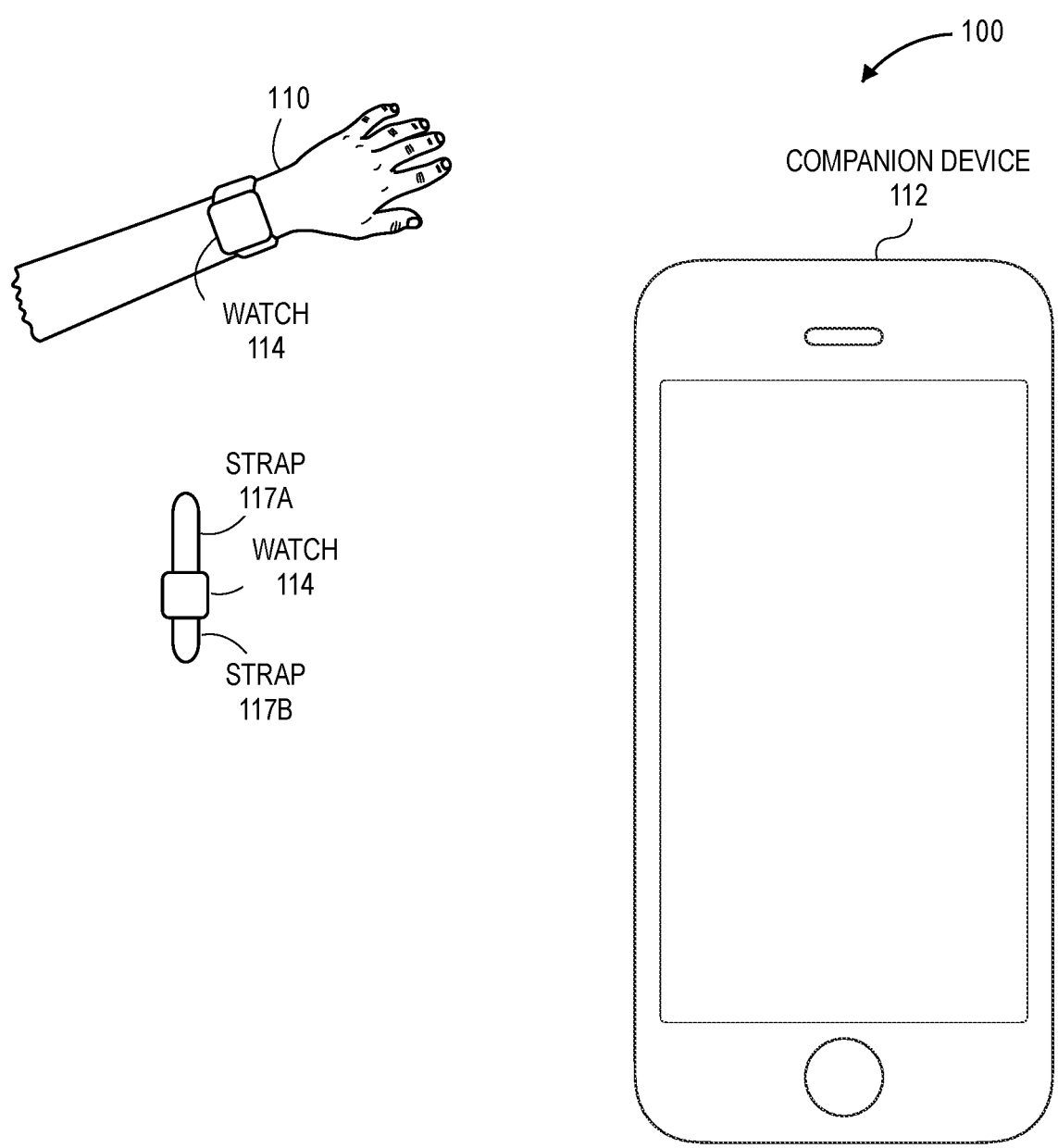
FIG. 1 illustrates a wearable and companion device, according to an embodiment.

A wearable device, such as a smart watch device, can be paired with a companion device that may have been lost, stolen, upgraded, or otherwise replaced. During a data exchange with the previous companion device, a migration key can be synced between the wearable device and the previous companion device. The migration key can be part of a keychain or in a backup of the previous phone stored in secured storage. In one embodiment, a user can provide the user credentials to access the secured storage for the new companion device to perform a backup restore of the previous companion device and receive the migration key from the restored backup synced with the wearable. The new companion device can also receive the migration key from a keychain from secured storage. The new companion device can detect the wearable when advertising using an identification (ID) key of the wearable and migration can occur on secured and encrypted channels using the migration key. In this way, the wearable can move to a new companion device on a secured and encrypted communication channel without a user having to validate the wearable during initial paining with the new companion device, e.g., by optically scanning a code or entering a PIN while maintaining data in the wearable. In one example, the wearable and new companion device can be can be locked, and a user can enter a passcode to unlock the devices to initiate migration from the wearable to the new companion device. In some examples, if the wearable and companion device are not locked, a user is not required to enter passcodes and migration can occur based on the synced migration key.

Various examples, embodiments and aspects will be described with reference to details discussed below, and the accompanying drawings will illustrate the various examples and embodiments. The following description and drawings are illustrative and are not to be construed as limiting. Numerous specific details are described to provide a thorough understanding of various embodiments. In certain instances, well-known or conventional details are not described in order to provide a concise discussion of the examples and embodiments.

Reference in the specification and detailed description to an "example" or "embodiment" means that a particular feature, structure, or characteristic described in conjunction with the example or embodiment can be included in at least one example and embodiment. The appearances of the phrase "in one example" or "in one embodiment" in various places in the specification do not necessarily all refer to the same embodiments. The processes depicted in the figures that follow can be performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Wearables or accessories may can include watches or other devices, such as GPS trackers, fitness trackers, glasses (e.g., virtual reality head mounted displays), jewelry, shoes or clothes or other wearable items, heart monitor, health sensor, glucose monitor, audio accessory (e.g., headphone or earphone) and other accessories that can operate with a companion device. Although the specification focuses on watches and smartphones, examples and embodiments disclosed herein can include other types of wearables or accessories such as a fitness tracker and migration of the fitness tracker to a new companion device.

In the examples and embodiments disclosed herein, "migration", "migrates", or "migrating" refers to a wearable moving to a new companion device. In one example, migration includes moving the settings and pairings for the wearable to the new companion device from a previously paired companion device based on a migration key. For example, the wearable and new companion device can validate each other for migration using the migration key. In one example, the wearable is not required to have connectivity with the previously paired companion device or the Internet to migrate to the new companion device. Migration can also occur on a secured and encrypted communication channel without a user having to validate the wearable during initial pairing with the new companion device, e.g., by optically scanning a code on the wearable by the new companion device or entering a PIN. Data on the wearable can be maintained without data loss during migration to the new companion device. Migration can include syncing migration keys in the wearable and new companion device that allow the wearable to migrate to the new companion device.

Examples and embodiments are disclosed allowing for convenient and secured migration of a wearable to a new companion device. In one example, an operation, process or method performed by a companion device (e.g., a new companion device) to a wearable including receiving a migration key. The wearable is detected if it is associated with the migration key, and the wearable migrates to the companion device if it is detected to be associated with the migration key. In one example, a secured and encrypted communication channel is established between the wearable and the companion device for migration based on the migration key. In one example, there is also no requirement, for the wearable to have connectivity to a previously paired companion device or the Internet. In one example, on the secured and encrypted communication channel, settings and pairings can change for the wearable to move to the companion device based on the migration key. In one example, the wearable is a watch and the companion device is a new phone.

Example Wearables and Companion Devices

FIG. 1 shows an example of a set 100 of devices such as a watch 114 on a wrist of a user 110, the watch 114 including straps 117A and 117B and a companion device 112. Examples of companion device 112 include a smartphone, tablet computer, laptop computer or other consumer electronic device that can be paired with the multiple wearables or accessories or wearables, such as watch 114 over, e.g., a standard wireless connection and protocol such as a Bluetooth connection and protocol. In one example, watch 114 can be paired with a previous companion device having a trusted relationship and secured sharing of data. Data and content of watch 114 can be backed up in the previous companion device. For example, data on watch 114 can continuously or automatically be stored in the previous companion device when paired to the companion device. The previous companion device 112 can have a backup including the backup of the watch 114. The backup of the companion device 112 can be stored in secured storage system. The secured storage system can be a cloud-based storage system or encrypted storage on a laptop or desktop computing device.

Companion device 112 can be a new device replacing the previous companion device, which may have been lost, stolen or discontinued. A user of the new companion device can restore the backup of the previous companion device on the new companion device. In one example, a migration key associated with the backup of the previous companion device can be synced in the companion device 112 and watch 114. Based on the migration key, a secured and encrypted channel can be established between companion device and watch 114 without a user having to validate watch 114 during initial paining with companion device 112, e.g., by optically scanning a code on watch 114 by companion device 112 or entering a PIN. In some examples, if watch 114 or companion device 112 is locked, watch 114 or companion device 112 can be unlocked using a passcode. However, having a user to validate watch 114 during initial pairing with companion device 112 by, e.g., optically scanning a code on watch 114 by companion device 112 or entering a PIN, e.g., a Bluetooth PIN, is not required. Watch 114 can maintain its data when moving a new companion device, e.g., companion device 112. Watch 114 can operate both on or off the wrist of a user 110. In one example, watch 114 can be an Apple Watch and companion device 112 can be Apple iPhone®. Exemplary secured storage includes an iCloud® backup or an encrypted backup created via iTunes®.

Figure 2A:
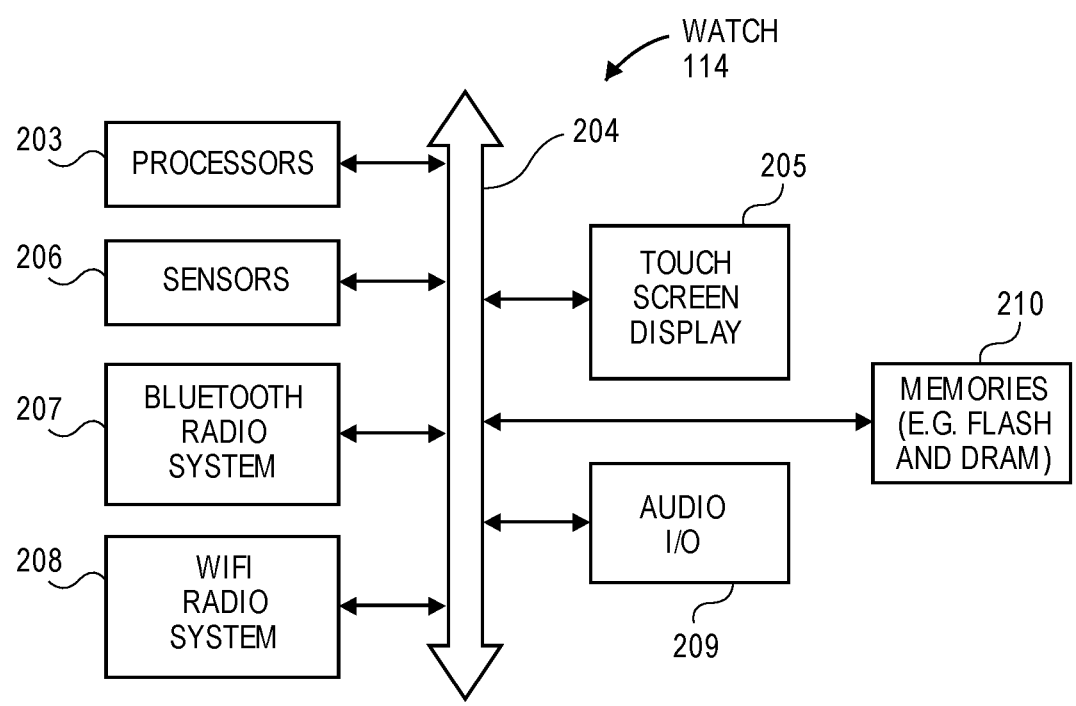
FIG. 2A is a block diagram of system components of a wearable device, according to embodiments described herein.
Figure 2B:
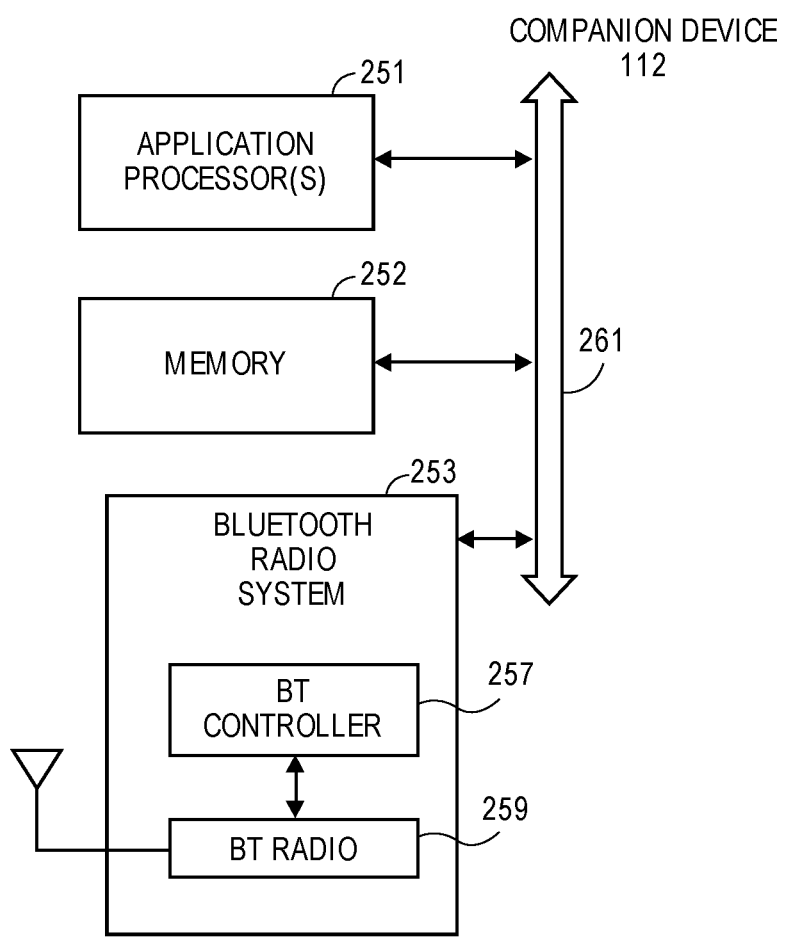
FIG. 2B is a block diagram of a system for a companion device, according to embodiments described herein.

Watch 114 and companion device 112 can be both near a user. For example, companion device 112 can be in a user's pocket or next to the user, and watch 114 can be worn by a user or placed near companion device 112. In another example, a user can have companion device 12 in a pocket or briefcase or purse or on a desk, while the user removes watch 114 and places watch 114 on a table or desk. The proximity of watch 114 and companion device 112 allows wireless communications such as Wi-Fi radio systems and Bluetooth (BT) radio systems implemented in the devices, e.g., as shown in FIGS. 2A-2B, to communicate with each other within wireless communication range for those examples. Furthermore, migration techniques disclosed in FIGS. 3A-8 can be implemented for any type of wearable or accessory device and companion device, e.g., a watch and smartphone, which can communicate with each other having a data processing and wireless systems as disclosed in FIGS. 2A-2B.

Example Wireless Communication Systems

FIGS. 2A-2B are example block diagrams of systems for watch 114 and companion device 112 of FIG. 1 including wireless systems. Referring to FIG. 2A, watch 114 can include one or more processors 203 coupled to one or more buses 204 interconnecting the components of watch 114. Examples of components include one or more sensors 206, touch screen display 205 which both displays images to the user and also can receive touch inputs on the screen of the display. Watch 114 includes one or more memories 210, examples of which include flash memory, DRAM memory and ROM memory or other like memories. The memories can store data shared between companion device 112 or other devices. Examples of stored data can include restored backup of a previous companion device including private information such as keychain information for the secure communication of data and protection of data, and financial information, e.g., credit card information etc., associated with a user of companion device 112 and watch 114.

Watch 114 can include audio input/output 209 such as a microphone and one or more speakers. Sensors 206 can include one or more accelerometers or motion detectors or orientation detectors or other sensors which can sense when a wrist is raised or lowered. Sensors 206 can also include sensors that sense a proximity to a wrist or sense reflections from a wrist, such as LED based sensors that generate LED light and then sense reflected LED light that has been reflected by the wrist's skin. Other types of sensors can also (or alternatively) be used such as a sensor in a buckle. Watch 114 includes Bluetooth radio system 207 and Wi-Fi radio system 208 coupled to one more busses 204 interconnected to other components of watch 114, which can provide Bluetooth and Wi-Fi communications according to standard Bluetooth and Wi-Fi protocols, e.g., IEEE 802.11 wireless standards or near field communication (NFC) protocols. In one example, watch 114 and companion device 112 includes a network security layer used to communicate messages including receiving and sending Bluetooth messages and encrypted off the record (OTR) messages in establishing a secured encrypted channel. In other examples, any type of encryption technology can be used to encrypt messages.

In one example, Bluetooth radio system 207 in watch 114 can be used to communicate with a new companion, e.g., companion device 112, and to transmit unencrypted or encrypted messages (or packets) including a migration key in which companion device 112 can detect to allow watch 114 to migrate to companion device 112 as disclosed in FIGS. 3A-8. The exemplary components for watch 114 in FIG. 2A can be used to implement watches 314, 714 and 814 described in FIGS. 3A, 7A and 8. In one example, watch 114 can use Bluetooth radio system 207 to implement secured migration messaging and communication on secured and encrypted communication channels between companion device 112 according to techniques described in FIGS. 3A-8. For example, companion device 112 can implement a backup restore of a previous companion device and prompt a user to migrate a wearable, e.g., watch 114, to companion device 112 having the backup restored using a migration key according to exemplary migration techniques described in FIGS. 3A-8.

Referring to FIG. 2B, a system for companion device 112 is shown having one or more application processors 251 coupled to one or more busses 261 interconnecting to memory 252, and Bluetooth system 253. Bluetooth (BT) system 253 includes a BT controller 257 and BT radio transceiver 259, which can also be included in Bluetooth radio system 207 of watch 114 and are coupled together. Companion device 112 can have the same or similar components as watch 114 and components shown in FIG. 2B, which can be used to perform migration of watch 114 to companion device 112 according to techniques described in FIGS. 3A-8. For example, application processor 251 of companion device 112 can restore a backup of a previous companion device from a secured storage system such as iCloud® or iTunes® stored in memory 252 in companion device 112. Application processor 251 can prompt the user of companion device 112 to migrate a wearable, e.g., watch 114, to companion device 112, and, if migration is initiated, Bluetooth radio system 253 can communicate with watch 114 using a migration and secured migration techniques disclosed in FIGS. 3A-8C on secured and encrypted communication channels.

Exemplary Wearable Migration Architecture to New Companion Device

Figure 3A:
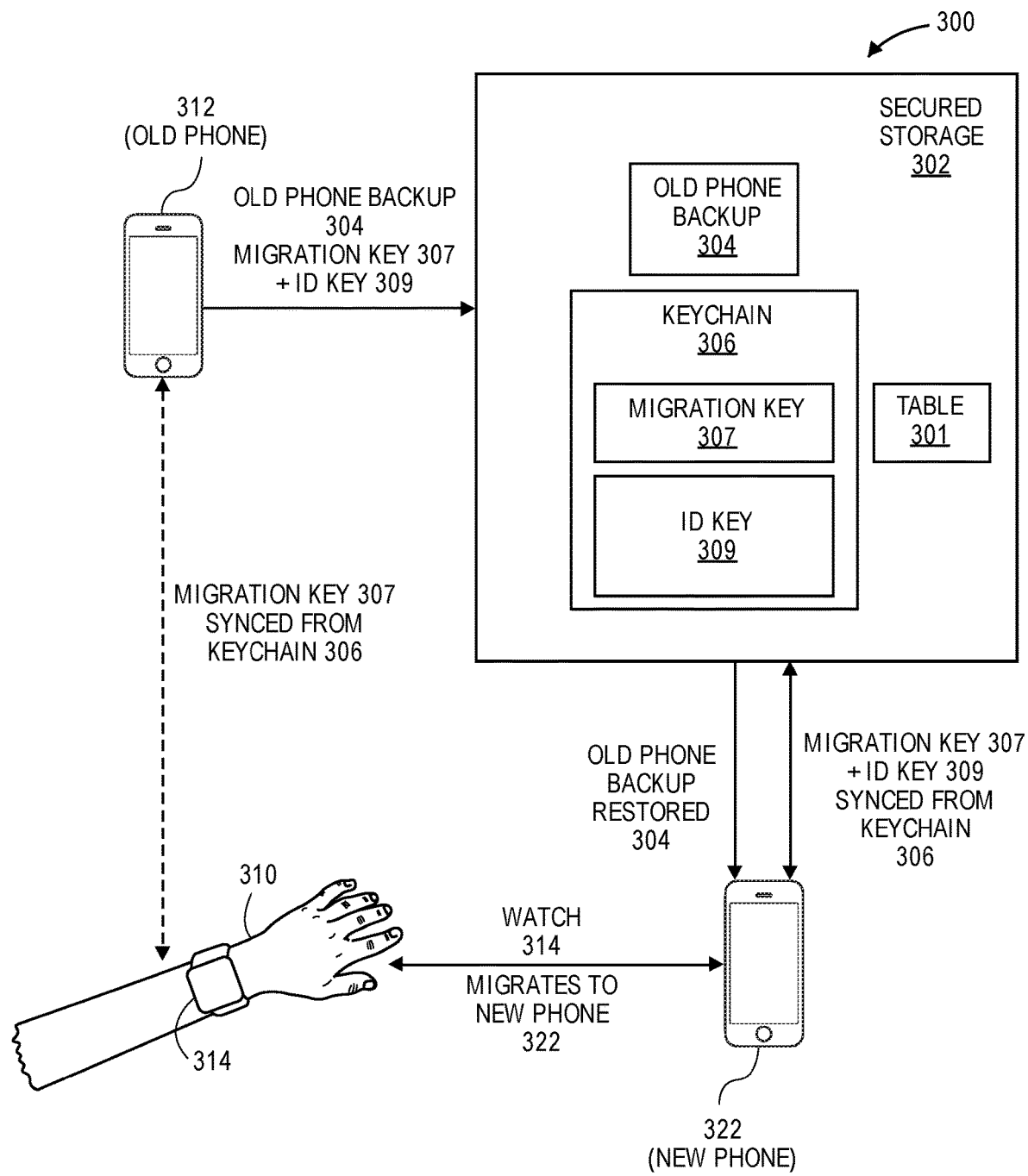
FIG. 3A illustrates a wearable migration architecture for a set of devices, according to embodiments described herein.

FIG. 3A shows one example of a wearable migration architecture 300 using a set of devices such as a watch 314 on a wrist of a user 310, old phone 312, secured storage 302, and new phone 322. In one example, watch 314 is an Apple watch, new phone 322 and old phone 312 are iPhones, and secured storage 302 can be iCloud® or iTunes® secured storage. In one example, migration architecture 300 can provide Class A through D data and file protection and security.

Migration architecture 300 and the techniques and examples disclosed herein can implement the techniques, examples, embodiments, methods and operations disclosed in U.S. patent application Ser. No. 14/871,484 entitled "BACKUP ACCESSIBLE BY SUBSET OF RELATED DEVICES," filed on Sep. 20, 2015; U.S. patent application Ser. No. 14/872,532 entitled "DATA PROTECTION FOR KEYCHAIN SYNCING," filed on Aug. 17, 2015; and U.S. patent application Ser. No. 15/273,414 entitled "SWITCHING BETWEEN WATCHES OR OTHER ACCESSORIES," filed on Aug. 17, 2015, which are all incorporated herein by reference and commonly assigned.

Watch 314 can implement hardware-encrypted storage and class-based protection of files and keychain items. For the migration techniques disclosed herein, watch 314 can be unlocked or locked, e.g., unlocked by entering a passcode or locked with no passcode entered. In the exemplary architecture 300, secured migration techniques are implemented to migrate watch 314 to new phone 322 using migration key 307 and ID key 309 as part of keychain 306. ID key 309 allows new phone 322 to discover or detect watch 314 and migration key 307 is synced between the devices in order for watch 314 to migrate to new phone 322.

Keychain 306 is a locked and encrypted container including private, sensitive, and confidential data such as account names and passwords or security keys for applications, servers, websites, and cloud services and accounts. Keychain 306 can also store confidential information such as credit card numbers and information and personal identification numbers (PINs) for bank accounts and other personal accounts. Keychain 306 allows safe and secured storage of account names, passwords, security keys, credit card numbers and information, etc. on user approved devices. For example, keychain 306 can be user approved on watch 314, old phone 311, secured storage 302, and new phone 322, which can be synced on all of a user's devices and secured accounts and services. In one example, keychain 306 includes migration key 307 and ID key 309 but can store other information and keys not shown. In one example, migration key 307 can be used by new phone 322 to detect, determine, or verify if watch 314 is associated with migration key 307, and, in such a case, migration can proceed from watch 314 to new phone 322. ID key 309 can be used to identify and communicate with watch 314.

In one example, migration key 307 can be any type of encryption/decryption key, e.g., an Advanced Encryption Standard (AES) key used to encrypt and decrypt data or content. And, in one example, ID key 309 can be an Identity Resolution Key, which is a Bluetooth encryption key, used by a first device to encrypt a random medium access control (MAC) address of the first device and used by a second device to identify the real MAC address of the first device and communicate with it. In one example, new phone 322 can detect ID key 309 of watch 314 advertising over Bluetooth and watch 314 and new phone 322 can communicate Bluetooth messages including migration key 307 in determining if migration can proceed from watch 314 to new phone 322 according to techniques disclosed in FIGS. 7A-7C and 8 on secured and encrypted communication channels. Migration can occur without having a user validate watch 314 during initial pairing with new phone 322, e.g., by optically scanning a code on watch 314 by new phone 322 or entering a PIN, e.g., a Bluetooth PIN and data on watch 314 can be maintained without loss of data.

In this example, a wearable such as watch 314 worn on a wrist of a user originally paired with old phone 312. Watch 314 can have its contents encrypted and backed up continuously or automatically in old phone 312 using keys part of keychain 306. For example, watch application specific data, layouts, settings, health and fitness data, and etc. can be backed up on old phone 312, and old phone 312 can have an old phone backup 304, which can include the backup of watch 314, stored in secured storage 302 in a secured manner with appropriate user credentials, e.g., login ID, password, etc. In one example, old phone backup 304 can include meta data associated with the old phone 312 and watch 314 including ID key 309 or migration key 307, which can be maintained on watch 314. In one example, migration key 307 in keychain 306 is synced between watch 314, old phone 312 and new phone 322. For example, keychain 306 can be synced according to examples and techniques disclosed in the U.S. patent application Ser. No. 14/872,532 incorporated herein by reference.

Old phone 312 can store its backup as old phone backup 304 in secured storage 302, which can include backup data and content from watch 314. Old phone 312 can store and have keychain 306 enabled in secured storage 302. In one example, old phone 312 can use one or more keys in keychain 306 to encrypt old phone backup 304 to secured storage 302. Keychain 306 can store an ID key 309 associated with old phone 312 or watch 314. In other example, ID key 309 can store multiple ID keys associated with old phone 312 and watch 314 or other watches used by a user. Secured storage 302 can also store tables 301 which can link paired watches to a specific phone (e.g., old phone 312) and can be updated periodically in secured storage 302 as further detailed in FIG. 3B.

In one example scenario for wearable migration architecture 300, after old phone 312 stores an old phone backup 304 in secured storage 302, old phone 312 can become lost, stolen, or discontinued. In one example, the user of watch 314 and old phone 312 has keychain 306 enabled in secured storage 302 and obtains a new phone 322. During setup of new phone 322, the user is prompted to restore a backup of old phone 312 from secured storage 302 using user credentials for old phone 312 to authenticate the user. For example, backup of old phone 312 can be accessible by new phone 322 using the techniques and examples disclosed in U.S. patent application Ser. No. 14/871,484 incorporated herein by reference.

Other authentication methods such as two-level authentication can be used to authenticate the user of new phone 322 to restore old phone backup 304 from old phone 312 which may be lost, stolen or discontinued. In one example, the user of new phone 322 provides secured storage credentials (e.g., iCloud or iTunes user identification and passwords) to access old phone backup 304 and keychain 306 associated with old phone 312 and/or watch 314. In one example, new phone 322 can prompt the user to migrate watch 314 to new phone 322 after a restore of old phone backup 304 according to FIGS. 4A-4C. In another example, a user may wish to migrate watch 314 after a backup restore has been conducted on new phone 322. In such a scenario, as shown in FIGS. 5A-5F, new phone 322 can list watches using tables 301 stored in secured storage 302 that may have paired with watch 314 and prompt the user on watch 314 to migrate to new phone 322. Migration techniques disclosed and described herein can be used to migrate watch 314 or other watches to new phone 322 using migration key 307 as described in FIGS. 7A-7C and 8 on a secured and encrypted communication channel without a user having to validate watch 314 during initial pairing with new phone 322. For example, migration can be performed without requiring the user optically scan a code on watch 314 by new phone 322 or requiring the user to enter a PIN, such as a Bluetooth PIN during initial Bluetooth pairing. In one example, watch 314 can move settings and pairings to new phone 322 based on migration key 307. Exemplary settings and pairings are disclosed in U.S. patent application Ser. No. 15/273,414 incorporated herein by reference. The migration architecture 300 can be implemented for examples and embodiments disclosed in FIGS. 4A-9.

Figure 3B:
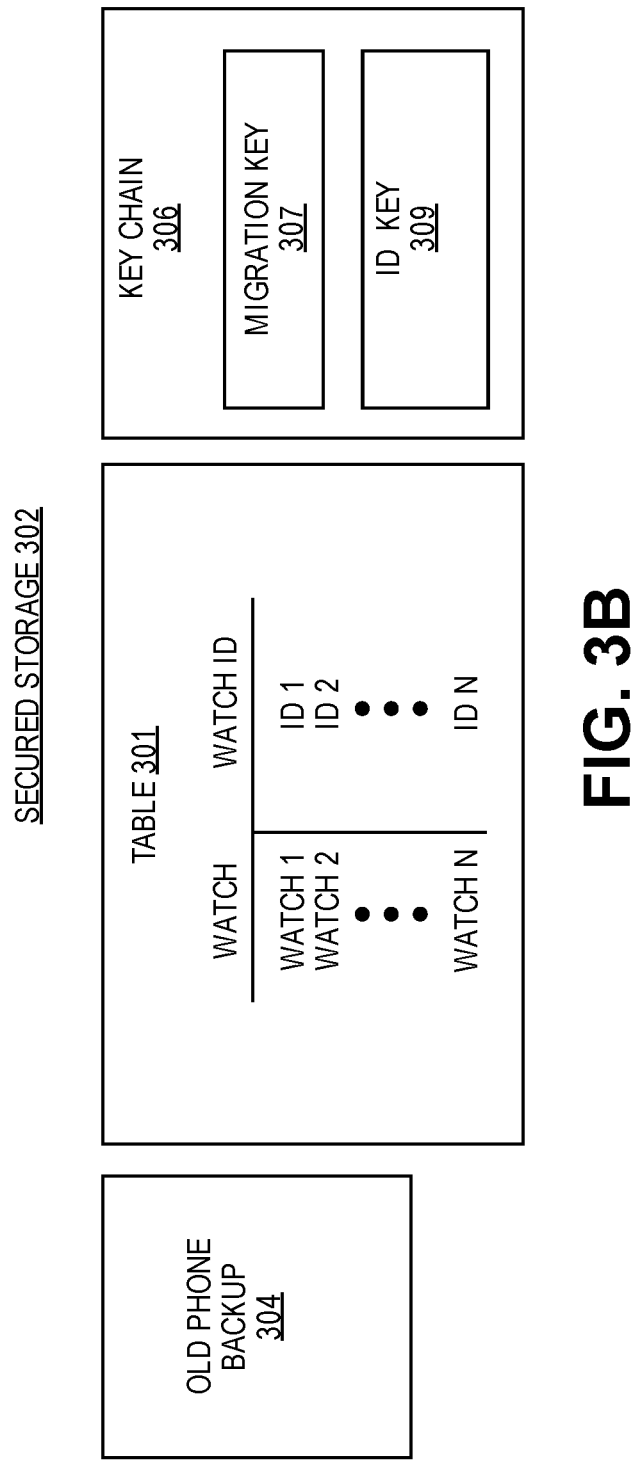
FIG. 3B illustrates secured storage details, according to embodiments.

FIG. 3B shows one example of details of table 301 in secured storage 302 of FIG. 3A. In one example, table 301 links watches 1-N to watch ID 1-N that link to specific phones. In some examples, ID 1-N can be IRK keys for the Bluetooth protocol. Table 301 can be updated periodically in secured storage 302, which stores old phone backup 304 and keychain 306. A user of watch 314 and old phone 312 can have an individual account in secured storage 302 and can access old phone backup 304 using personal account credentials such as a password and user ID for and iCloud® or iTunes® account. In other examples, access to old phone backup 304 requires migration key 307 and/or ID key 309 in keychain 306, and watches 1-N listed in table 301 can migrate to new phone 322 as described in FIGS. 4A-4C, 5A-5F, 6, 7A-7C and 8.

Examples of Wearable Migration to New Companion Device

Figure 4A:
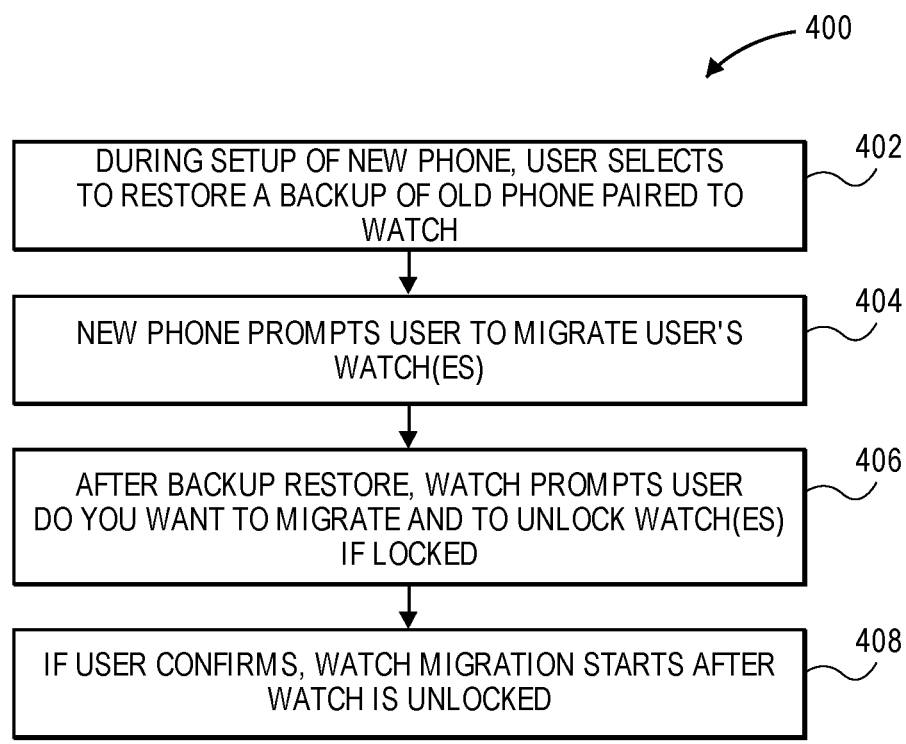
FIG. 4A-4C illustrate a method and associated user interfaces to migrate a wearable device to new companion device, according to embodiments described herein.
Figure 4C:
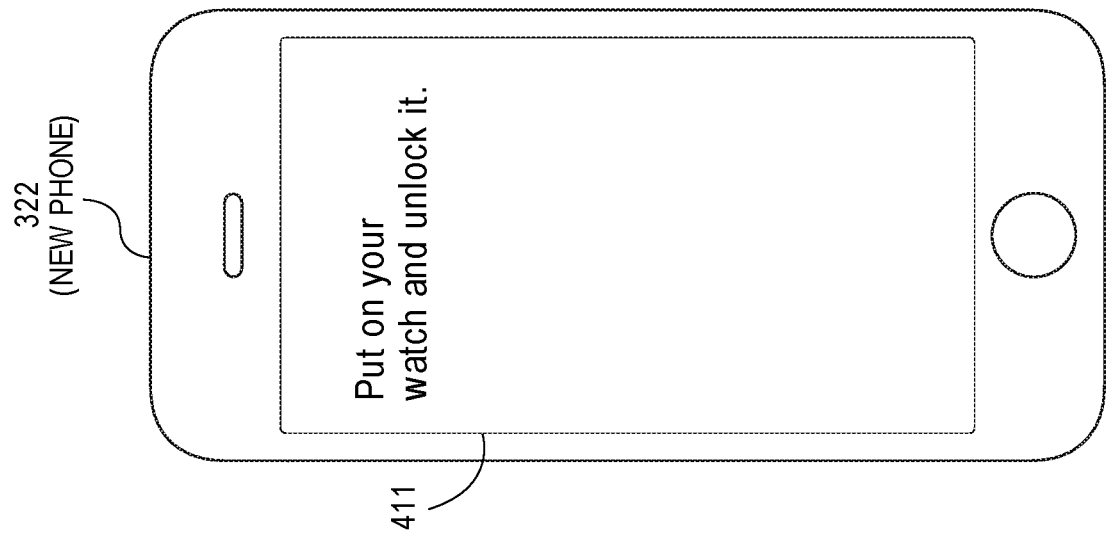
Figure 4B:
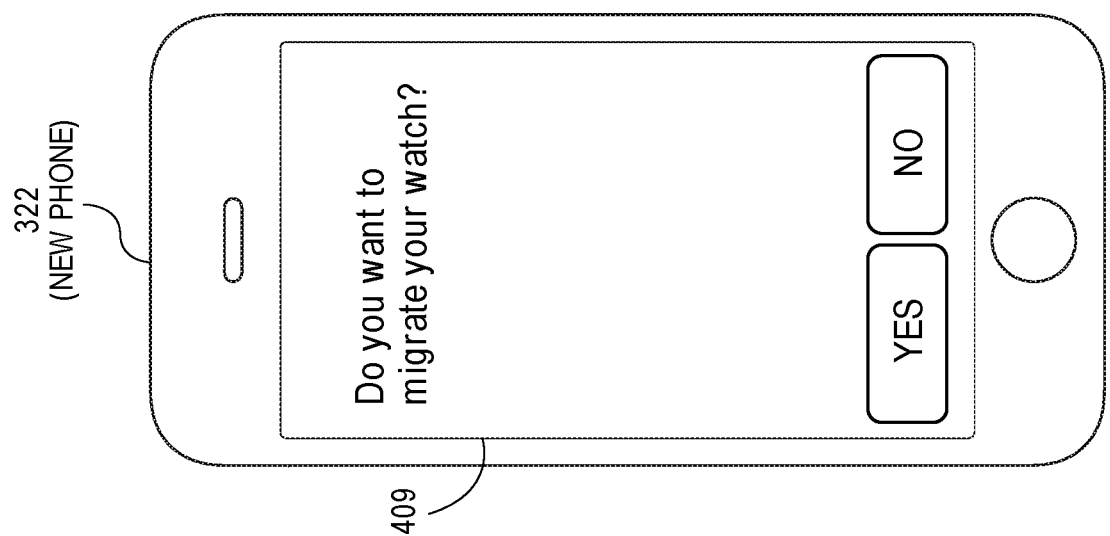

FIGS. 4A-4C show one example of a method 400 and associated user interfaces to migrate a watch to a new phone during set up of the new phone with reference to FIGS. 3A-3B. Referring to FIG. 4A, method 400 includes operations 402, 404, 406 and 408.

At operation 402, during setup of a new phone (e.g., new phone 322), a user selects to restore a backup (e.g., old phone backup 304) of an old phone (e.g., old phone 312) paired previously to a watch (e.g., watch 314). Old phone backup 304 can be stored in a secured storage 302 such as iCloud® or iTunes®.

At operation 404, new phone 322 can prompt the user to migrate watch 314 to new phone 322. For example, referring to FIG. 4B, user interface 409 can be shown on new phone 322 asking the user "Do you want to migrate your watch?" providing options "YES" or "NO." Alternatively, this interface can be provided on watch 314. By selecting YES, the user can proceed to migration and selecting NO the user can still have the option of migrating a watch to new phone 322 at a later time.

At operation 406, after the restore of old phone backup 304 in new phone 322, watch 314 prompts the user do you want to migrate (e.g., FIG. 5C interface 510) and to unlock watch 314 if it was locked it (e.g., FIG. 4C interface 411). This can occur after watch 314 is detected and associated with a migration key 307 in accordance with techniques in FIGS. 7A-7C and 8.

At operation 408, if the user confirms, watch migration starts as described, e.g., in FIGS. 7A-7C or FIG. 8, and after watch 314 is unlocked by the user if locked. Other user interfaces new phone 322 and watch 314 can be provided such as indication that migration has completed or is in progress. By using the migration techniques disclosed herein, watch 314 can migrate to new phone 322 and re-establish a secured connection and access to old phone backup 304, which can include backed up data and content of watch 314. This can occur without loss of data in watch 314 and a user is not required to validate watch 314 during initial pairing with new phone 322, e.g., by optically scanning a code on watch 314 or entering a PIN, e.g., a Bluetooth PIN that is displayed by one device so that the user is required to enter the PIN on the other device during the initial Bluetooth pairing. In other words, migration can occur without a user having to enter a communication code such as a Bluetooth PIN.

FIGS. 5A-5C shows one example of a method 500 and exemplary user interfaces to migrate one or more watches to a new phone after set up of the new phone with reference to FIGS. 3A-3B. Referring to FIG. 5A, method 500 includes operation 502, 504 and 506.

At operation 502, a new phone (e.g., new phone 322) opens a watch application and provides, as shown in FIG. 5B, watch interface 509 listing Watches 1-N, which may have paired with an old phone (e.g., old phone 312), and prompting the user "Do you want to migrate the watches?" with options "YES" or "NO." The listed watches can be obtained from table 301 during a restore of old phone backup 304 at the setup of new phone 322 prior to method 500.

At operation 504, if the user enables the option to migrate watches, Watch 314 prompts the user, as shown in FIG. 5C, with user interface 510 on Watch 314, e.g., asking the user "Watch 1 detected do you want to migrate now?" with options "YES" or "NO." Watch 1 can be identified as watch 314 that paired with old phone 312 and detected by new phone 322 using the techniques disclosed in FIGS. 7A-7C or FIG. 8.

At operation 506, if the user confirms to migrate now for Watch 1, migration can proceed as described in FIGS. 7A-7C or FIG. 8. Other user interfaces can be provided for new phone 322 and watch 314 or other watches giving indications that migration has completed or is in progress. By using the migration techniques disclosed herein, one or more watches 1-N including watch 314 paired to old phone 312 can migrate to new phone 322 and move setting and pairing from old phone 312 to new phone 322.

FIGS. 5D-5F illustrate an exemplary method 520 and user interfaces (user interface 529 FIG. 5E and user interface 530 FIG. 5F) for a new phone 322 and watch 314 illustrating migration of watch 314 to new phone 322 without having a user validate watch 314 during initial pairing with new phone 322, e.g., by optically scanning a code on watch 314 or entering a PIN which can be displayed by one device so that the user is required to enter the PIN on the other device during initial pairing.

At operation 522, a new phone (e.g., new phone 322) detects watch 314 based at least on a migration key synced with watch 314 based on techniques described in FIGS. 3A and 7A-8. Watch 314 can be detected in either a locked or unlocked state showing, e.g., a clock in interface 530 of FIG. 5F. In some examples, if watch 314 or new phone 322 is locked, a user can unlock watch 314 or new phone 322 can be unlocked using a passcode to start migration, but the user is not required to validate watch 314 during initial pairing with new phone 322 by, e.g., optically scanning a code on watch 314 or entering a PIN initial pairing between watch 314 and new phone 322. In other examples, if watch or new phone 322 is not configured with passcodes or unlocked, migration can occur by using synced migration key 307.

At operation 524, new phone 322 prompts the user to migrate the detected watch 314. For example, new phone 322 can prompt a user with interface 529 asking the user "Do you want to migrate your watch?" with options "YES" or "NO." Watch 314 can be paired with an old phone, e.g., old phone 312.

At operation 526, if the user confirms to migrate and has unlocked the new phone and the watch 314, migration occurs from watch 314 to new phone 322 without further action from a user to validate watch 314 during initial pairing with new phone 322 such as, e.g., optically scanning a code on watch 314 with new phone 322 or entering a PIN during initial pairing. In one example, watch 314 is not required to have connectivity to a previously paired phone or with the Internet for migration to occur with new phone 322. Thus, migration can be performed in one example without requiring entry of a Bluetooth PIN for initial pairing between watch 314 and new phone 322 on either the new phone or the watch if the watch and new phone have been unlocked by the user and if the new phone has received the keychain from a backup or other source.

Figure 6:
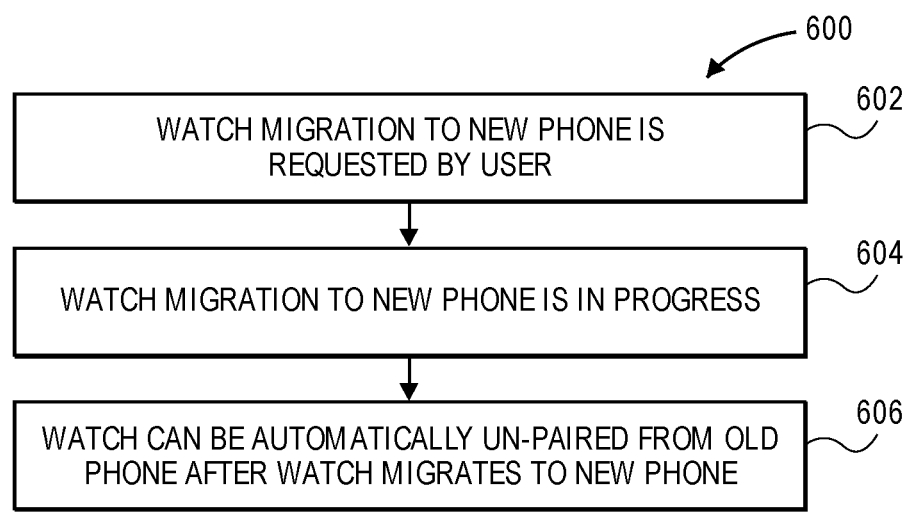
FIG. 6 illustrate a migration process, according to an embodiment.

FIG. 6 shows one example of a method 600 for requesting migration and migration in progress with reference to FIGS. 3A-3B. Referring to FIG. 6, method 600 includes operation 602, 604 and 606. Method 600 can provide a user with options during the migration is progress. At operation 602, watch (e.g., watch 314) migration to a new phone (e.g., new phone 322 is requested by a user. For example, new phone 322 can provide a watch application to initiate migration with watch 314. In one example, if watch migration is requested watch applications on new phone 322 can be locked pending watch migration. At operation 604, watch migration is initiated and an indicator can be provided on new phone 322 to indication migration is in progress. At operation 606, watch 314 is paired with new phone 322 and can be automatically un-paired with a previously paired phone (e.g., an old phone) by network security layers in watch 314 and new phone 322.

Exemplary Migration Security Models and Messaging

Figure 7A:
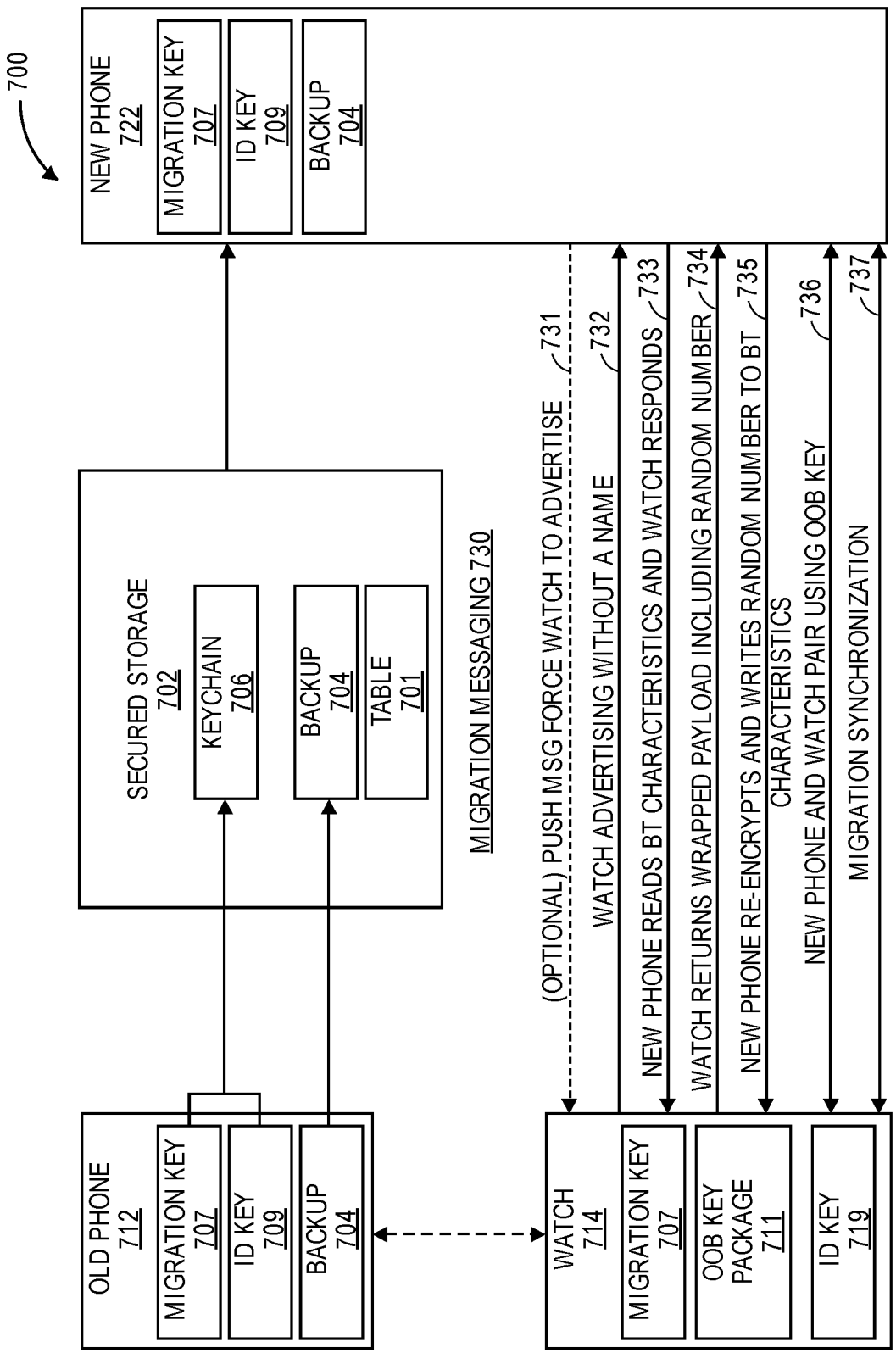
FIG. 7A-7C illustrate a migration security model, operations and messages for migrating a wearable to a new companion device, according to embodiments described herein.
Figure 7B:
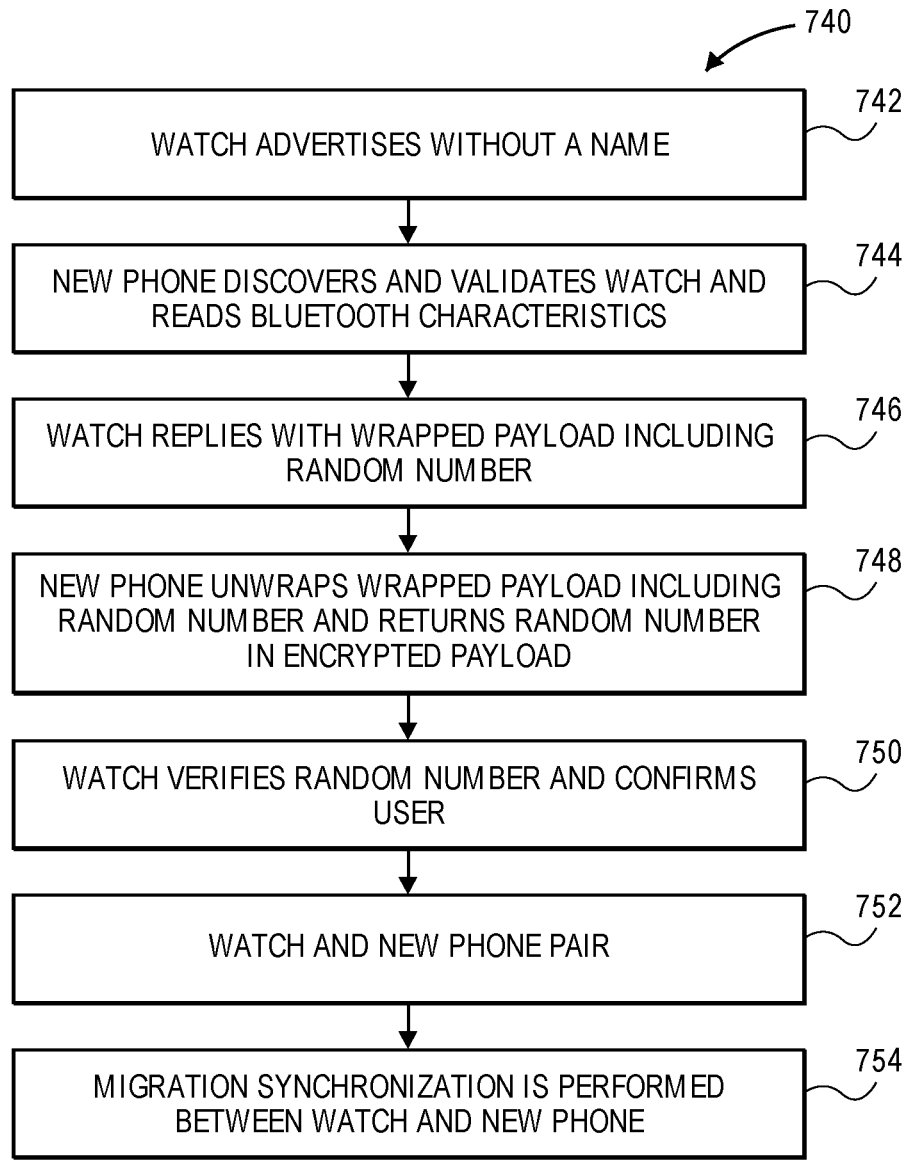
Figure 7C:
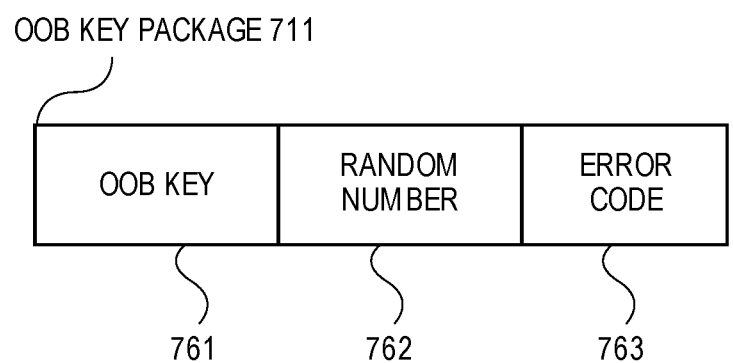

FIGS. 7A-7C shows one exemplary migration security model, operations and messages for migrating a wearable to a new companion device. Referring to migration security model 700 of FIG. 7A, in one example, migration security model 700 provides Class A data protection using a Class A key. In one example, watch 714 is unlocked using, e.g., operations disclosed in FIG. 4A-4C or 5A-5C to unlock watch 714 for migration to new phone 722.

Watch 714 was paired with old phone 712 and can continuously and automatically back up its data and content in old phone 712. Old phone 712 stores migration key 707 and ID key 709 in keychain 706 and creates backup 704. ID key 709 is an identifier for old phone 712 and can include ID key 719 and identifier for watch 714. Backup 704 can include backed up data and content from watch 714 including ID key 719. Old phone 712 stores backup 704 in secured storage 702 and enables keychain 706.

Watch 714 and old phone 712 sync migration key 707. In one example, old phone 712 may become lost, stolen or discontinued. In the following examples, the power or connectivity state of the old phone 712 is not relevant for migration. For example, the old phone 712 need not be turned on or connected to a network or secured storage 702 for migration of watch 714 to new phone 722 to occur. New phone 722 restores backup 704 of old phone 712 from secured storage 702, which can be iCloud® or iTunes®. For example, during setup of new phone 722, restoring backup 704 from secured storage 702 can occur. Migration key 707 and ID key 709 are synced in new phone 722. In the following techniques, a secured and encrypted communication channel can be established without having a user validate watch 714 during initial pairing with new phone 722, e.g., by optically scanning a code on watch 714 by new phone 722 or entering a PIN during initial pairing or requiring connectivity by watch 714 with a previously paired phone or the Internet.

On new phone 722, as illustrated in FIGS. 4B-4C and 5B, a user is prompted to start migration of watch 714 to new phone 722 with one or more user interfaces. Once migration is initiated by the user, migration messaging 730 can occur between watch 714 and new phone 722 to communicate messages 731 through 737 for the migration sequence method 740 of FIG. 7B to migrate watch 714 to new phone 722.

Referring to FIG. 7B, an exemplary migration sequence method 740 includes operations 742 through 754. At operation 742, the watch (e.g., watch 714) advertises without a name. For example, watch 714 can send a message 731 (FIG. 7A) to new phone 722, which can include Bluetooth Low Energy (BTLE) packets including a payload using standard Bluetooth protocols in order to establish a connection with new phone 722. The payload can include ID key 719 of watch 714 and BT characteristics of watch 714. In one example, ID key 719 can be a Bluetooth Identity Resolution Key (IRK) used by new phone 722 to identify a randomly generated medium access control (MAC) address of watch 714 and to communicate with watch 714. In some examples, the ID key 719 is used to identify the real MAC address of watch 714. An optional push message 731 can be sent to watch 714 from new phone 722 to force watch 714 to advertise if not advertising.

At operation 744, new phone 722 discovers and validates watch 714 and reads Bluetooth characteristics after receiving an advertisement from watch 714. For example, new phone 722 can determine if ID key 719 from watch 714 matches a synced ID key 709 from keychain 706 to validate watch 714. ID key 719 can be an identification for watch 714 stored in table 701 in secured storage 702 that links to old phone 712. New phone 722 can respond by sending a response message 733 including a response packet.

At operation 746, watch 714 replies with encrypted message 734 including a payload with an Bluetooth out-of-band (OOB) key package and a random number. For example, referring to FIG. 7C, watch 714 generates a Bluetooth out-of-band (OOB) key package 711 including an OOB key 761, random number 762, and error code 763. Random number 762 can include a "salt" random number or key. In one example, random number 762 can be a "nonce" or a "challenge." In one example, encrypted message 734 is encrypted by watch 714 with a derived key based on a derivation function that can take quantized time stamps in set intervals (e.g., quantization in 5 minute intervals) and other inputs to generate a derived key used for encryption and decryption. For example, a time value of 8:40 pm can be quantized and the hour portion stripped off in which the minutes can be divided by 5 giving a value of 8 providing a time stamp value of 8. Time stamp values of 7 and 9 can indicate a previous time stamp and a next time stamp based on 5 minutes. In one example, a 15 minute window can be used for acceptable derived keys corresponding to a previous time stamp, current time stamp, and next time stamp to encrypt and decrypt messages with a random number. For example, if a returned time stamp value does not indicate a previous time stamp, current time stamp, or a next time stamp the encrypted message is not authenticate. In one example, the payload of encrypted message 734 is wrapped with migration key 707 and a type field indicating encrypted message is for new phone 722.

At operation 748, new phone 722 unwraps encrypted message 734 including random number 762 and returns the random number 762 to watch 714 in a wrapped payload of encrypted message 735 using a different derived key based on a derivation function quantizing time stamp values including migration key 707 and a field value indicating encrypted message 735 is for watch 714. If the time stamp value does not indicate a previous time stamp value, current time stamp value, or next time stamp value, watch 714 cannot decrypt message 735 or authenticate it. In one example, new phone 722 uses a derived key based on the quantized time stamped values to decrypt encrypted message 734. Other keys can be used by new phone 722 to decrypt the wrapped encrypted message 734. If the proper derived key is not used for the encrypted message, migration of watch 714 to new phone 722 cannot occur and determining the random number 762 during decryption is not possible by new phone 722. In one example, if migration key 707 does not match the migration key in the encrypted message, new phone 722 cannot send an encrypted message 735 returning the random number 762 to watch 714.

At operation 750, watch 714 verifies the random number returned from new phone 722 is random number 762 in OOB key package 711 and confirms the user of new phone 722. Once the user of new phone 722 is confirmed, watch 714 can respond to pairing requests from new phone 722 and pair with new phone 722 using OOB key 761 generated by watch 714.

At operation 752, watch 714 and new phone 722 pair using OOB key 761 and the watch 714 moves to new phone 722. For example, watch 714 and new phone 722 can pair under the Bluetooth protocol and exchange encrypted pairing messages 736 and settings in watch 714 move from old phone 712 to new phone 722 on a secured and encrypted communication channel. In such an example, new phone 722 sends Bluetooth pairing requests to watch 714 that will respond to the pairing requests for a limited period of time. In one example, new phone 722 sends an OOB pairing request to watch 714 using OOB key 761 in OOB key package 711. Watch 714 can verify the OOB key 761 sent in the pairing request by new phone 722.

At operation 754, migration synchronization is performed between watch 714 and new phone 722 exchanging migration synchronization messages 737 on a secured and encrypted communication channel. In one example, for migration synchronization, watch 714 and new phone 722 are added as paired devices for use by network security layer in watch 714 and new phone 722. Network security layers can communicate encrypted off the record (OTR) messaging between new phone 722 and watch 714 after pairing. During migration synchronization, watch 714 moves to new phone 722 with respective settings of old phone 712 set to new phone 722 including adding the device pair to network security layers and having access to old phone backup 704 restored in new phone 722. In one example, data and content from old phone backup 704 can move to watch 714 to restore previous data and content shared with old phone 712 without having to re-authenticate the user with new phone 722. Watch 714 can also maintain data without loss of data during migration to new phone 722.

FIG. 8 shows one example of migration message polling 800 when a wearable (e.g., watch 814) is locked. In one example, unlocking watch 814 by a user is not required to start migrating watch 814 to new phone 822 in which new phone 822 can receive a notification message to initiate migration with watch 814. In one example, watch 814 is unlocked to complete migration with new phone 822. In the example of FIG. 8, Class A and Class C security protection are used to encrypt data using Class A and C keys. In one example, all migration messages are encrypted using a Class C key and messages including an 00B key and random number, e.g., a nonce or challenge are encrypted using a Class A key. For example, the operations in FIG. 7B can be implemented with the read and write responses migration messaging 800 as disclosed in FIG. 8 including messages 801 through 808.

Referring to FIG. 8, in one embodiment a Bluetooth (BT) communication implementation is illustrated in which new phone 822 has a backup restored from a different phone paired to watch 814 and new phone 822 sends a read request message 801 to watch 814 and migration keys and ID keys of the different hone are synced in new phone 822 as described in FIG. 3A. Watch 814 provides a read response such as message 802 which is an Encrypted BTMigrationWatchResponse. In one example, the response message 802 can include a data structure shown below:

```
message BTMigrationWatchResponse {
  optional bytes cChallenge = 1;
  optional int32 errorCode = 2;
  optional bool errorIsFatal = 3;
  optional BTMigrationCiphertext aOOBData = 5;
  optional bool ready = 6;
}
```

In the above WatchResponse, aOOBData and cChallenge, which can be a random number are encrypted using a Class A key. The aOOBData includes bytes for BTMigrationOOBData encrypted with a Class A key into BTMigrationCiphertext and sent inside message 802 for BTMigrationWatchResponse. In one example, cNonce is used for BT pairing between new phone 822 and watch 814. In one example, the data structure for MTMigrationOOBData can include:

```
message BTMigrationOOBData {
  optional bytes oobKey = 1;
  optional bytes aChallenge = 2;
}
```

In one example, message 802 can be encrypted using MTMigrationCiphertext, with exception of the aChallenge and OOBData, which is a Class C key in response to a BT characteristic read on watch 814. The data structure for MTMigrationCiphertext can include:

```
message BTMigrationCiphertext {
  optional bytes salt = 1;
  optional bytes ciphertext = 2;
}
```

In one example, MTMigrationCiphertext is a 256-bit AES encryption/decryption key and includes a salt key (which can be a random number of 64 bits or 256 bits). In one example, the salt value can change for each message so a unique identifier cannot be snooped for each message. The Watch or Phone identification can be added to the salts so watch cannot decrypt its own messages.

This Ciphertext can also include other 256-bit values to verify correct decryption, time-derived keys. The new phone 822 provides a write response message 803 such as Encrypted BTMigrationChallengeWrite. In one example, a data structure for BTMigrationChallengeWrite can include:

```
message BTMigrationChallengeWrite {
optional bytes Challenge = 1;
optional string phoneName = 2;
}
```

BTMigrationChallengeWrite is encrypted into a BTMigrationCiphertext with a Class C key. In one example, cChallenge can have two values—a cChallenge that requests a user consent and a aChallenge that requests a user consent and enters a BT pairing mode if consent is received and a passcode is entered. Watch 814 can provide a write response message 804 verifying if the correct Nonce was sent or verifying other keys. New phone 822 can send another read request message 805 and watch 814 can provide a read response message 806 including an EncryptedBTMigrationWatchResponse. New phone 822 can provide a write message 807 including EncryptedBTMigrationNonceWrite. In one example, migration consent logic can be represented as a table to maintain status and keep track of when consent is received.

The above migration message polling can be used to verify watch 814 and new phone 822 and migration synchronization can be performed as described in FIGS. 7A-7B. For example, watch 814 can move to new phone 822 such that watch 814 and new phone 822 are paired and can communicate using respective network security layers. Network security layers can communicate encrypted off the record (OTR) messaging between new phone 822 and watch 814 after the new phone 822 pairs with watch 814 without having a user validate watch 814 during initial pairing with new phone 822, e.g., by optically scanning a code on watch 814 by new phone 822 or entering a PIN during initial pairing. During migration synchronization, watch 814 moves to new phone 822 with respective settings of an old phone set to new phone 822 including adding the device pair to a network security layer and having access to old phone backup restored in new phone 822. In one example, data and content from an old phone backup can move to watch 814 to restore previous data and content shared with an old phone.

Exemplary Migration Data Processing System

Figure 9:
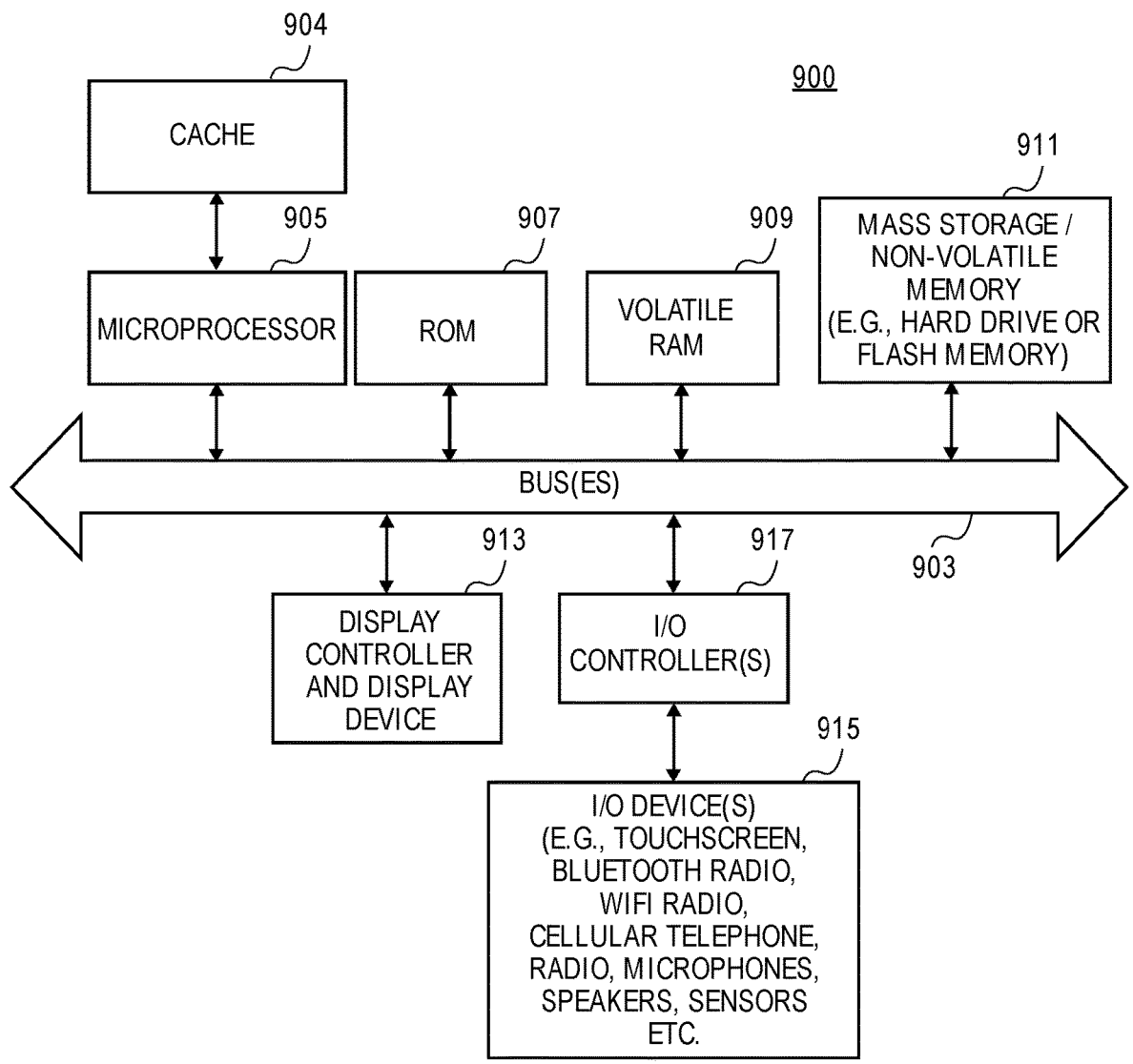
FIG. 9 is a block diagram of migration data processing system for use in embodiments described herein.

FIG. 9 shows one example of a data processing system, which may be used with any one of the examples or embodiments described herein, for migration. In the following example, various components of a data processing system such as a companion device or a paired accessory are illustrated, which can represent any particular architecture or manner of interconnecting components as such details are not germane to this description. In other examples, consumer electronic devices and other data processing systems, which may have fewer components or more components may also be used with one or more examples and embodiments described herein.

Referring to FIG. 9, computer system 900, which is a form of a data processing system, includes bus 903, which is coupled to one or more microprocessor(s) 905 and ROM (Read Only Memory) 907 and volatile RAM 909 (e.g. DRAM) and non-volatile memory 911. One or more microprocessors 905 are coupled to optional cache 904. These microprocessors 905 may retrieve stored computer programs instructions from one or more of non-transitory memories 907, 909 and 911 and execute the instructions to perform operations described above. These memories can represent examples of machine readable non-transitory storage media that can store or contain computer program instructions which when executed cause a data processing system to perform the one or more methods described herein. Bus 903 interconnects these various components together and also interconnects these components 905, 909 and 911 to display controller and display device 913 and to peripheral devices such as input/output (I/O) devices 915 which may be one or more of sensors (e.g., sensors 206 in FIG. 2A), mice, touch screens, touch pads, touch sensitive input devices, keyboards, dedicated keys (e.g. buttons for volume or mute or home, etc.) modems, network interfaces, Bluetooth radio systems, printers and other devices which are well known in the art. In one example, input/output devices 915 are coupled to the system through input/output controllers 917, and volatile RAM (Random Access Memory) 909 can be implemented as dynamic RAM (DRAM), which may require power continually in order to refresh or maintain the data in the memory.

Mass storage 911 can be a magnetic hard drive or a magnetic optical drive or an optical drive or a DVD RAM or a flash memory or other types of memory system which maintain data (e.g., large amounts of data) even after power is removed from the system. Mass storage 911 can also be a random-access memory although this is not required. In one example, mass storage 911 is a local device coupled directly to the rest of the components in data processing system 900 and, in other examples, data processing system 900 may utilize a non-volatile memory which is remote from the system, such as a network storage device which is coupled to the data processing system through a network interface such as a modem, an Ethernet interface or a wireless network. Bus 903 may include one or more buses connected to each other through various bridges, controllers and/or adapters.

Figure 10:
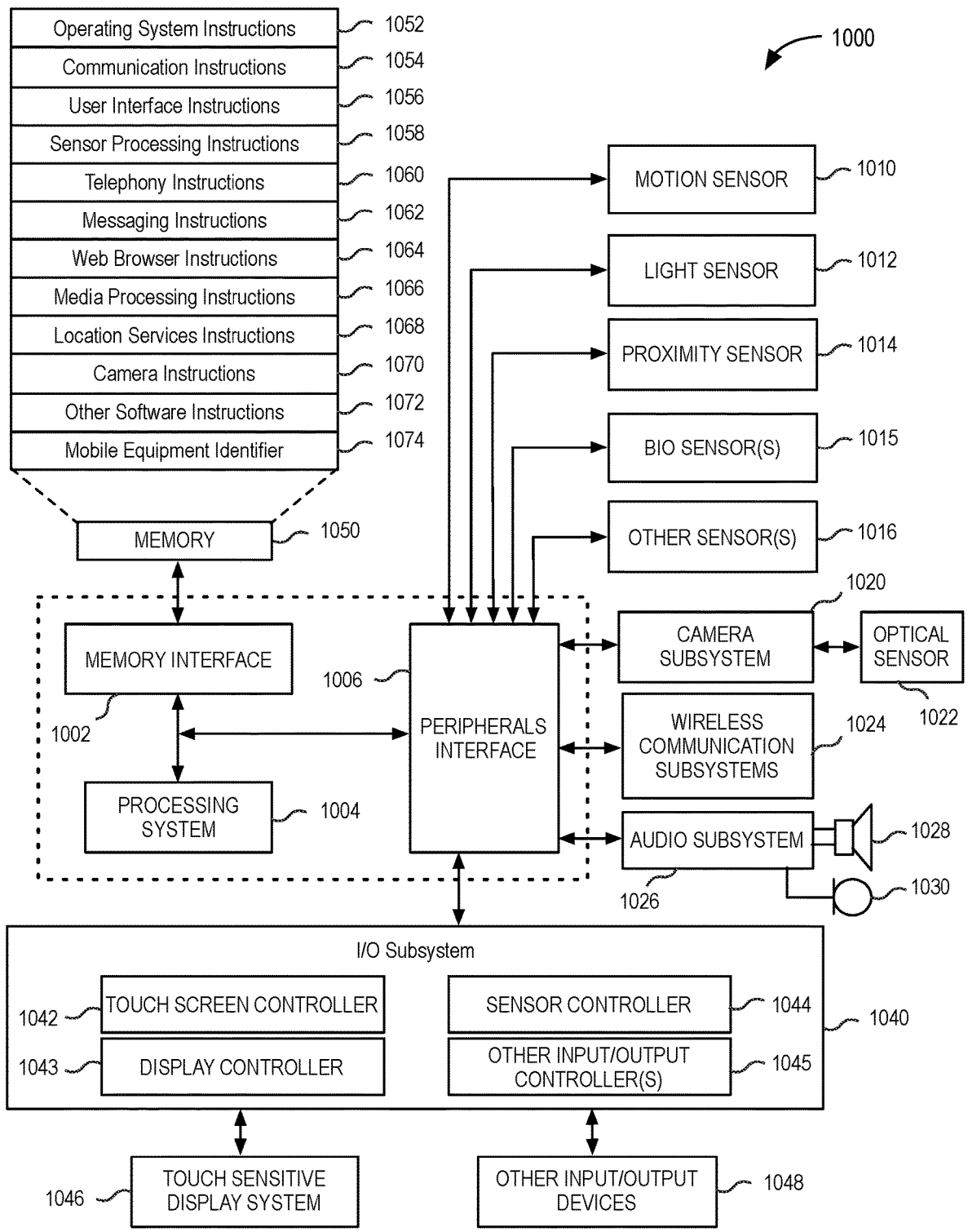
FIG. 10 is a block diagram of a device architecture for a mobile or embedded device, according to an embodiment described herein.

FIG. 10 is a block diagram of a device architecture 1000 for a mobile or embedded device, according to an embodiment. The device architecture 1000 includes a memory interface 1002, a processing system 1004 including one or more data processors, image processors and/or graphics processing units, and a peripherals interface 1006. The various components can be coupled by one or more communication buses or signal lines. The various components can be separate logical components or devices or can be integrated in one or more integrated circuits, such as in a system on a chip integrated circuit. The device architecture 1000 can be used to implement a client device 106 as described herein.

The memory interface 1002 can be coupled to memory 1050, which can include high-speed random-access memory such as static random-access memory (SRAM) or dynamic random-access memory (DRAM) and/or non-volatile memory, such as but not limited to flash memory (e.g., NAND flash, NOR flash, etc.).

Sensors, devices, and subsystems can be coupled to the peripherals interface 1006 to facilitate multiple functionalities. For example, a motion sensor 1010, a light sensor 1012, and a proximity sensor 1014 can be coupled to the peripherals interface 1006 to facilitate the mobile device functionality. One or more biometric sensor(s) 1015 may also be present, such as a fingerprint scanner for fingerprint recognition or an image sensor for facial recognition. Other sensors 1016 can also be connected to the peripherals interface 1006, such as a positioning system (e.g., GPS receiver), a temperature sensor, or other sensing device, to facilitate related functionalities. A camera subsystem 1020 and an optical sensor 1022, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1024, which can include radio frequency receivers and transmitters and/or optical (e.g., infrared) receivers and transmitters. The specific design and implementation of the wireless communication subsystems 1024 can depend on the communication network(s) over which a mobile device is intended to operate. For example, a mobile device including the illustrated device architecture 1000 can include wireless communication subsystems 1024 designed to operate over a GSM network, a CDMA network, an LTE network, a Wi-Fi network, a Bluetooth network, or any other wireless network. In particular, the wireless communication subsystems 1024 can provide a communications mechanism over which a media playback application can retrieve resources from a remote media server or scheduled events from a remote calendar or event server.

An audio subsystem 1026 can be coupled to a speaker 1028 and a microphone 1030 to facilitate voice-enabled functions, such as voice recognition, voice replication, digital recording, and telephony functions. In smart media devices described herein, the audio subsystem 1026 can be a high-quality audio system including support for virtual surround sound.

The I/O subsystem 1040 can include a touch screen controller 1042 and/or other input controller(s) 1045. For computing devices including a display device, the touch screen controller 1042 can be coupled to a touch sensitive display system 1046 (e.g., touch-screen). The touch sensitive display system 1046 and touch screen controller 1042 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 1046. Display output for the touch sensitive display system 1046 can be generated by a display controller 1043. In one embodiment, the display controller 1043 can provide frame data to the touch sensitive display system 1046 at a variable frame rate.

In one embodiment, a sensor controller 1044 is included to monitor, control, and/or processes data received from one or more of the motion sensor 1010, light sensor 1012, proximity sensor 1014, or other sensors 1016. The sensor controller 1044 can include logic to interpret sensor data to determine the occurrence of one of more motion events or activities by analysis of the sensor data from the sensors.

In one embodiment, the I/O subsystem 1040 includes other input controller(s) 1045 that can be coupled to other input/control devices 1048, such as one or more buttons, rocker switches, thumb-wheel, infrared port, USB port, and/or a pointer device such as a stylus, or control devices such as an up/down button for volume control of the speaker 1028 and/or the microphone 1030.

In one embodiment, the memory 1050 coupled to the memory interface 1002 can store instructions for an operating system 1052, including portable operating system interface (POSIX) compliant and non-compliant operating system or an embedded operating system. The operating system 1052 may include instructions for handling basic system services and for performing hardware dependent tasks. In some implementations, the operating system 1052 can be a kernel.

The memory 1050 can also store communication instructions 1054 to facilitate communicating with one or more additional devices, one or more computers and/or one or more servers, for example, to retrieve web resources from remote web servers. The memory 1050 can also include user interface instructions 1056, including graphical user interface instructions to facilitate graphic user interface processing.

Additionally, the memory 1050 can store sensor processing instructions 1058 to facilitate sensor-related processing and functions; telephony instructions 1060 to facilitate telephone-related processes and functions; messaging instructions 1062 to facilitate electronic-messaging related processes and functions; web browser instructions 1064 to facilitate web browsing-related processes and functions; media processing instructions 1066 to facilitate media processing-related processes and functions; location services instructions including GPS and/or navigation instructions 1068 and Wi-Fi based location instructions to facilitate location based functionality; camera instructions 1070 to facilitate camera-related processes and functions; and/or other software instructions 1072 to facilitate other processes and functions, e.g., security processes and functions, and processes and functions related to the systems. The memory 1050 may also store other software instructions such as web video instructions to facilitate web video-related processes and functions; and/or web shopping instructions to facilitate web shopping-related processes and functions. In some implementations, the media processing instructions 1066 are divided into audio processing instructions and video processing instructions to facilitate audio processing-related processes and functions and video processing-related processes and functions, respectively. A mobile equipment identifier, such as an International Mobile Equipment Identity (MEI) 1074 or a similar hardware identifier can also be stored in memory 1050.

Each of the above identified instructions and applications can correspond to a set of instructions for performing one or more functions described above. These instructions need not be implemented as separate software programs, procedures, or modules. The memory 1050 can include additional instructions or fewer instructions. Furthermore, various functions may be implemented in hardware and/or in software, including in one or more signal processing and/or application specific integrated circuits.

Described herein have been examples and embodiments that techniques to migrate a wearable to a new companion device. As described herein, migration is secured by syncing and verifying a migration key in the wearable and new companion device. In this way, the wearable and new companion device can validate each other for migration using the migration key. In one example, migration includes moving settings and pairings of the wearable to the new companion device in response to detecting the wearable is associated with the migration key, wherein the migration key establishes a validation of trust of the wearable relative to the companion device. The settings and pairings can include configuration and protected data and one or more keys to establish a trust relationship between the wearable and new companion device. The settings and pairings can also include device data such that the wearable can be discoverable by the new companion device.

In one example, migrating the wearable to the new companion device can be performed on a secured and encrypted communication channel using at least the migration key. The migration key can automatically establish the validation without requiring a user interaction to validate the wearable relative to the new companion device. In one example, the validation is based on a prior validation between the wearable and another companion device and wherein the migration key is received from a backup storage or the another companion device.

In another example, migration includes moving the settings and pairings for the wearable to the new companion device on a secured and encrypted communication channel without having a user to validate the wearable during initial pairing with the new companion device, e.g., by optically scanning a code on the wearable by the new companion device or entering a communication code, e.g., personal identification number (PIN). In one example, if the wearable or new companion device are locked and a passcode is required to unlock the devices, a user can enter the passcode and unlock the devices to start migration. In other examples, if the devices are not locked, migration can occur on a secured channel using the migration key without a user entering a passcode. Data in the wearable can be maintained without data loss when migrating to the new companion device. In one example, a wearable such as a watch can migrate and move to a new companion device such as new phone, which may replace a previous or old phone that was lost, stolen, or upgraded, in a secured and convenient manner without a user having to validate the watch during initial pairing with the new companion device, e.g., by optically scanning a code on the watch by the new phone or entering a PIN such as a Bluetooth PIN.

According to one example, a method performed by a companion device relative to a wearable includes receiving a migration key. Detecting if the wearable is associated with the migration key, and migrating the wearable to the companion device. Migrating the wearable to the companion device can include moving settings and pairings of the wearable to the companion device in response to detecting the wearable is associated with the migration key. The migration key can establish a validation of trust of the wearable to the companion device. In one example, one or more additional wearables are detected if associated with the migration key. The one or more additional wearables migrate to the companion device if the one or more additional wearables are associated with the migration key. A secured and encrypted communication channel can be established between the wearable or one or more additional wearables and the companion device to migrate the wearables to the companion device. The migration includes moving settings and pairings of the wearable or settings and pairings of the one or more additional wearables to the companion device without losing data in the wearable or one or more additional wearables.

In one example, an identification (ID) key of the wearable or one or more additional wearables is received. The wearable or one or more additional wearables can be detected when advertising using the ID key of the wearable or one or more additional wearables. The ID key of the wearable or one or more additional wearables is received from a keychain or a backup of a different companion device from secured storage. The backup or keychain can include the migration key, and the backup of the different companion device can be restored in the companion device. In one example, a user interface is provided on the companion device to identify the wearable or the one more additional wearables, and an option is provided on the user interface to start migration of the wearable or one or more additional wearables to the first companion device. The wearable or one or more additional wearables can be a watch and the companion device can be a phone. In one example, the watch and phone can be can be locked, and a user can enter a passcode to unlock the devices to initiate migration from the watch to the phone. In some examples, if the watch and phone are not locked, a user is not required to enter passcodes and migration can occur based on the synced migration key.

In one example, a wearable can be a watch that was paired with a previous phone that was lost, stolen, or upgraded. A migration key associated with the watch and previous phone can be synced with a new phone. The migration key allows a watch to migrate to a new companion device if the migration is received by the new companion device. The migration key can be received in a backup of a previous device or a keychain in secured storage which is synced with the watch. With the migration key, the watch can migrate to the new phone a secured and encrypted communication channel without a user having to, e.g., optically scan a code on the watch by the new companion device or entering a PIN such as a Bluetooth PIN during initial pairing. Additionally, in one example, no connectivity with the previous phone or the Internet is required by the watch to migrate to the new phone.

According to another example, a method performed by a watch include advertising without a name including an identification (ID) key. A validation is received from a phone having the ID key and a migration key. An encrypted message based on a first derived key is sent to the phone, and the encrypted message includes a random number. An encrypted message based on a second derived key is received from the phone including the random number, wherein the second derived key is different than the first derived key. In one example, the first and second derived keys are different to verify the phone decrypted the random number and to ensure the same message or first derived key from the watch is not sent back to the watch with the random number. In one example, the first and second derived keys can be derived using a key derivation function implemented at the watch and phone. In one example, the key derivation function can take quantized time stamps and other values as inputs to generate the first and second derived keys. In one example, the different quantized time stamps can be used including a previous time stamp, current time stamp, and next time stamp, which can be used to encrypt and decrypt messages including the random number.

In one example, encrypted off the record (OTR) messages can be communicated between the watch and new phone without having to re-authenticate a user. Data in the watch can be maintained without data loss in migrating to the watch to the new phone. An out-of-band (OOB) key package is generated including a OOB key and the random number. The payload of the encrypted message includes the OOB key package.

In one example, the watch is paired to the new phone using the OOB key. Migration of the watch is triggered to the new phone after a Bluetooth pairing to the old phone. The phone can be a newly paired phone which replaces from a previously paired phone to the watch. Settings and pairings of the previously paired phone are switched to the newly paired phone in the watch. For migration, the watch can be locked or unlocked.

According to another example, a data processing system includes a memory controller, a radio controller, and one or more application processors. The memory controller is coupled to one or more memories to store data. The radio controller is coupled to a radio transceiver. The one or more application processors are coupled to the memory controller and the radio controller executes an operating system and one or more applications on the data processing system, which is a wireless communication device. The one or more application processors are configured to receive a migration key, detect if a wearable is associated with the migration key, and migrate the wearable to the data processing system if the wearable is associated with the migration key.

In one example, wherein the one or more application processors are further configured to detect if one or more additional wearables are associated with the migration key, and migrate the one or more additional wearables to the data processing system if the one or more additional wearables are associated with the migration key. The one or more application processors are further configured to processors to establish a secured and encrypted communication between the wearable or one or more additional wearables and the data processing system.

In one example, the one or more application processors are further configured to move settings and pairings related to the wearable or settings and pairings of the one or more additional wearables to the data processing system without data loss to the wearable or one or more additional wearables. The one or more application processors are further configured to, receive an identification (ID) key of the wearable or one or more additional wearables, and detect the wearable or one or more additional wearables when advertising using the ID key of the wearable or one or more additional wearables. The one or more application processors are further configured to receive the ID key of the wearable or one or more additional wearables from a keychain or a backup of a different data processing system from secured storage.

In one example, the one or more application processors are further configured to restore the backup of the different data processing system in the data processing system, the backup or keychain including the migration key. The one or more application processors are further configured to provide a user interface on the companion device to identify the wearable or the one more additional wearables, wherein the user interface has an option on to start migration of the wearable or one or more additional wearables to the data processing system. The wearable or one or more additional wearables is a watch and the data processing system is a phone. The watch can be locked or unlocked to migrate the watch to the phone.

In the foregoing specification, specific examples and exemplary embodiments have been disclosed and described. It will be evident that various modifications may be made to those examples and embodiments without departing from the broader spirit and scope set forth in the following claims. The specification and drawings are, accordingly, to be regarded in an illustrative sense rather than a restrictive sense.

What is claimed is:

1. A non-transitory machine-readable medium storing instructions which, when executed by one or more processors of a newly pairable companion device, cause the newly pairable companion device to perform operations to pair the newly pairable companion device to a wearable device, the operations comprising:
    receiving a migration key from a backup storage associated with a previously paired companion device, the backup storage being separate from the wearable device and the newly pairable companion device, the migration key indicative of a previously established validation of trust for a pairing between the wearable device and the previously paired companion device;
    determining, using the migration key from the wearable device, that the wearable device is associated with the migration key;
    automatically validating a trust relationship between the newly pairable companion device and the wearable device using the migration key, the validation based on the previously established validation of trust between the wearable device and the previously paired companion device;
    obtaining wireless protocol characteristics from the wearable device; and
    in response to determining that the wearable device is associated with the migration key, initiating migration of the pairing of the wearable device from the previously paired companion device to the newly pairable companion device using the wireless protocol characteristics and without requiring user input to the wearable device, wherein migration of the pairing of the wearable device includes moving settings and pairing data of the wearable device to the newly pairable companion device irrespective of a connectivity state of the previously paired companion device.

2. The non-transitory machine-readable medium as in claim 1, further comprising:
    detecting if one or more additional wearable devices are associated with the migration key; and
    migrating pairings for the one or more additional wearable devices to the newly pairable companion device by moving settings and pairings of the one or more additional wearable devices to the newly pairable companion device, wherein migrating the pairings for wearable device or one or more additional wearable devices to the newly pairable companion device is performed on an encrypted communication channel, the encrypted communication channel encrypted using at least the migration key.

3. The non-transitory machine-readable medium as in claim 2, further comprising:
    receiving an identification (ID) key of the wearable device or the one or more additional wearable devices; and
    detecting the wearable device or the one or more additional wearable devices when advertising using the ID key, wherein receiving the ID key includes receiving the ID key from a keychain or a backup of the previously paired companion device from secured storage.

4. The non-transitory machine-readable medium as in claim 3, further comprising:
    restoring a backup of the previously paired companion device to the newly pairable companion device, the backup including the migration key.

5. The non-transitory machine-readable medium as in claim 3, further comprising:
    providing a user interface on the newly pairable companion device to identify the wearable device or the one more additional wearable devices, the user interface including an option to start migration of the wearable device or one or more additional wearable devices.

6. The non-transitory machine-readable medium as in claim 5, wherein the wearable device or the one or more additional wearable devices is an electronic watch device and the newly pairable companion device or the previously paired companion device is a smartphone device.

7. A data processing system comprising:
a memory controller coupled to one or more memories to store data;
a radio controller coupled to a radio transceiver; and
one or more application processors coupled to the memory controller and the radio controller, the one or more application processors executing an operating system and one or more applications on the data processing system, which is associated with a newly pairable companion device, the one or more application processors configured to:
receive, from a backup storage of a previously paired companion device, a migration key, the migration key indicative of a previously established validation of trust for a pairing between a wearable and the previously paired companion device, wherein the backup storage is separate from the wearable and the newly pairable companion device;
detect, using the migration key as receivable from the wearable, if the wearable is associated with the migration key;
automatically validate a trust relationship between the newly pairable companion device and the wearable using the migration key, the validation based on the previously established validation of trust between the wearable and the previously paired companion device;
obtain wireless protocol characteristics from the wearable; and
after detection that the wearable is associated with the migration key, initiate migration of a pairing of the wearable to the newly pairable companion device that is associated with the data processing system using the wireless protocol characteristics and without requiring user input to the wearable, wherein migration of the pairing includes moving settings and pairings of the wearable to the data processing system irrespective of a connectivity state of the previously paired companion device, the migration in response to detection that the wearable is associated with the migration key.

8. The data processing system of claim 7, wherein the one or more application processors are further configured to:
detect if one or more additional wearables are associated with the migration key, and
migrate the one or more additional wearables to the data processing system by moving settings and pairings of the one or more additional wearables to the data processing system without additional validation of the one or more additional wearables.

9. The data processing system of claim 8, wherein the one or more application processors are further configured to migrate the wearable or one or more additional wearables to the data processing system on an encrypted communication channel, the encrypted communication channel encrypted using at least the migration key.

10. The data processing system of claim 8, wherein the one or more application processors are further configured to:
receive an identification (ID) key of the wearable or one or more additional wearables from a keychain or a backup of the previously paired companion device on secured storage; and
detect the wearable or one or more additional wearables when advertising using the ID key of the wearable or one or more additional wearables.

11. The data processing system of claim 10, wherein the one or more application processors are further configured to restore the backup of the previously paired companion device to the newly pairable companion device, the backup including the migration key.

12. A method performed by a newly pairable companion device to pair the newly pairable companion device to a wearable device, the method comprising:
receiving a migration key from a backup storage associated with a previously paired companion device, the backup storage being separate from the wearable device and the newly pairable companion device, the migration key indicative of a previously established validation of trust for a pairing between the wearable device and the previously paired companion device;
determining, using the migration key from the wearable device, that the wearable device is associated with the migration key;
automatically validating a trust relationship between the newly pairable companion device and the wearable device using the migration key, the validation based on the previously established validation of trust between the wearable device and the previously paired companion device;
obtaining wireless protocol characteristics from the wearable device; and
in response to determining that the wearable device is associated with the migration key, initiating migration of the pairing of the wearable device from the previously paired companion device to the newly pairable companion device using the wireless protocol characteristics and without requiring user input to the wearable device, wherein migration of the pairing of the wearable device includes moving settings and pairing data of the wearable device to the newly pairable companion device irrespective of a connectivity state of the previously paired companion device.

13. The method as in claim 12, further comprising:
detecting if one or more additional wearable devices are associated with the migration key; and
migrating pairings for the one or more additional wearable devices to the newly pairable companion device by moving settings and pairings of the one or more additional wearable devices to the newly pairable companion device, wherein migrating the pairings for wearable device or one or more additional wearable devices to the newly pairable companion device is performed on an encrypted communication channel, the encrypted communication channel encrypted using at least the migration key.

14. The method as in claim 13, further comprising:
receiving an identification (ID) key of the wearable device or the one or more additional wearable devices; and
detecting the wearable device or the one or more additional wearable devices when advertising using the ID key, wherein receiving the ID key includes receiving the ID key from a keychain or a backup of the previously paired companion device from secured storage.

15. The method as in claim 14, further comprising restoring a backup of the previously paired companion device to the newly pairable companion device, the backup including the migration key.

16. The method as in claim 14, further comprising providing a user interface on the newly pairable companion device to identify the wearable device or the one more additional wearable devices, the user interface including an option to start migration of the wearable device or one or more additional wearable devices.

17. The method as in claim 16, wherein the wearable device or the one or more additional wearable devices is an electronic watch and the newly pairable companion device or the previously paired companion device is a smartphone.

\* \* \* \* \*